US008897344B2

(12) United States Patent
Maguire

(10) Patent No.: US 8,897,344 B2
(45) Date of Patent: Nov. 25, 2014

(54) ESTABLISHING COMMUNICATION

(71) Applicant: Facebook, Inc., Menlo Park, CA (US)

(72) Inventor: Yael G. Maguire, Boston, MA (US)

(73) Assignee: Facebook, Inc., Menlo Park, CA (US)

( * ) Notice: Subject to any disclaimer, the term of this patent is extended or adjusted under 35 U.S.C. 154(b) by 95 days.

(21) Appl. No.: 13/843,643

(22) Filed: Mar. 15, 2013

(65) Prior Publication Data

US 2014/0133530 A1　May 15, 2014

Related U.S. Application Data

(63) Continuation-in-part of application No. 13/485,117, filed on May 31, 2012, now Pat. No. 8,437,384.

(60) Provisional application No. 61/491,375, filed on May 31, 2011.

(51) Int. Cl.
*H04B 1/38*　(2006.01)
*H01Q 21/28*　(2006.01)

(52) U.S. Cl.
CPC ............... *H04B 1/38* (2013.01); *H01Q 21/28* (2013.01); *H04B 1/3805* (2013.01)
USPC ........................................................ 375/219

(58) Field of Classification Search
CPC ....... H04B 1/40; H04B 3/123; H04B 17/0042
USPC ................. 375/219, 267; 370/401; 455/562.1
See application file for complete search history.

(56) References Cited

U.S. PATENT DOCUMENTS

| 7,065,384 B2* | 6/2006 | Izadpanah | 455/562.1 |
| 8,493,986 B2* | 7/2013 | Shrum et al. | 370/401 |
| 2004/0264701 A1* | 12/2004 | Lee et al. | 380/270 |
| 2009/0163772 A1 | 6/2009 | Koide | |

(Continued)

FOREIGN PATENT DOCUMENTS

| JP | 2009-200574 | 9/2009 |
| KR | 10-2004-0094563 | 11/2004 |
| KR | 10-2005-0120520 | 12/2005 |
| WO | 2012/166907 | 12/2012 |

OTHER PUBLICATIONS

International Search report and Written Opinion for International Application PCT/US2012/040192, Dec. 18, 2012.

(Continued)

*Primary Examiner* — Daniel Washburn
*Assistant Examiner* — Fitwi Hailegiorgis
(74) *Attorney, Agent, or Firm* — Baker Botts L.L.P.

(57) ABSTRACT

In particular embodiments, a broadband receiver of a wireless communications device may poll a broadband communications channel for configuration data. Once the configuration data has been received, the channel may be established, and connection information may be transmitted to a base station. The connection information may be an identifier for a user of a social-networking system. Based on the identifier, the device may be able to establish a narrowband communications channel with the base station. Using the identifier, the base station may be able to begin retrieving social-networking information for the user while establishing a communications channel using the narrowband transceiver. Once the narrowband communications channel has been established, the wireless communications device may be able to receive the social-networking information over that channel and provide social-networking functionality.

17 Claims, 16 Drawing Sheets

(56) References Cited

U.S. PATENT DOCUMENTS

2010/0110910 A1  5/2010  Erceg
2010/0184450 A1  7/2010  Chen
2011/0131663 A1  6/2011  Kaikuranta
2012/0307875 A1  12/2012 Maguire

OTHER PUBLICATIONS

International Search Report and Written Opinion for International Application PCT/US2014/024859, Aug. 11, 2014.

Non-Final Office Action for U.S Appl. No. 13/763,546, Aug. 29, 2013.
Response to Non-Final Office Action for U.S Appl. No. 13/763,546, Feb. 12, 2014.
Final Office Action for U.S Appl. No. 13/763,546, Jun. 3, 2014.
Response to Final Office Action for U.S Appl. No. 13/763,546, Aug. 14, 2014.
Notice of Allowance for U.S Appl. No. 13/763,546, Sep. 3, 2014.

* cited by examiner

ESTABLISHING COMMUNICATION

PRIORITY

This application is a continuation-in-part claiming priority under 35 U.S.C. §120 to U.S. patent application Ser. No. 13/485,117, filed 31 May 2012, which claims the benefit of U.S. Provisional Patent Application No. 61/491,375 filed May 31, 2011, which is hereby incorporated herein by reference in its entirety.

TECHNICAL FIELD

The present invention relates to improvements, in mobile communication devices and methods using narrowband heterodyne communications, designed to achieve low-latency connections between sets of wireless devices.

BACKGROUND

Modern wireless devices have a large range and therefore may be in contact with many other wireless devices at any particular time. Thus, if a device is seeking to transfer data to or from another device, it may have a large number of devices from which to select the desired wireless device. Additionally, there is the possibility that another device within range may interfere with, or breach the security of, a particular wireless device. To minimize the potential for a security breach or interference issues, a formal connection process is often initiated between wireless communications devices.

Many RF communications systems employ frequency diversity to minimize interference. This helps design robust systems, but as with many technology designs, this often results in design tradeoffs, and in particular, introduces latency: if there are N channels available, and to detect if a device is present on any one channel takes a maximum time $\tau$, then there is a connection-pairing latency up to $N\tau$ between two devices. In a typical multiple-frequency narrowband communication system, a base station designates a frequency (channel) for communication with a particular device, the two devices perform a handshake protocol to establish communications over the designated channel, and typically other devices are required to avoid the channel(s) that are in-use by other devices, e.g., by detecting channels that are in-use or by using a designated communication path for establishing communications with the base station.

To improve latency, the time $\tau$ may be reduced such that $N\tau$ is imperceptible to a human. However, reducing the time $\tau$ may be a challenge because frequency hop time typically is set by the loop filter of the phase-locked loop (PLL) of the radio chip, and this may be constrained for reasons such as PLL noise performance requirements. One may also design a media-access control (MAC) layer protocol stipulating new devices initialize a network session with an a priori channel selection. This may work in a peer-to-peer environment if there is sufficient signal to interference-plus-noise ratio (SINR) at this specific channel to allow communication to occur, although it may not be ideal for a base-station-to-device model, as the base station may spend valuable time on this channel while not using other channel(s) for devices already connected. At the MAC level, there is also the issue of how much time a radio should spend trying to connect to other devices versus how much time should be spent communicating with devices that are already connected. Therefore, the frequency hopping design may be less robust than other designs when attempting to maximize throughput, while minimizing latency for communications. Many wireless protocols have different design tradeoffs for the optimization of throughput and latency. For example, in wide area networks using wireless standards such as 3G and 4G, the initial association latency may be large, as device to cell tower communication may persist for a long time and base station protocols have appropriate protocols for base station hand off as the wireless device moves around in an environment. In the IEEE 802.11 Wi-Fi standard, association times can be several seconds due to the relative low duty cycle of broadcast Beacon commands (typically every 100 ms), and the number of channels (11 primary Wi-Fi channels in the US in the 2.4 GHz frequency range). In the Bluetooth Low Energy (BTLE) standard, 3 reserved channels are provided out of 40 total for communication initiation to improve latency.

Some wireless devices can transfer data via infrared communication ports or with radio frequency (RF) data transfer. Microwave technologies such as Bluetooth and Wi-Fi allow non-line-of-sight device-to-device communication. However, due to security concerns, these technologies require a set-up process in which a device must be added to the network. Although near-field-communication (NFC) can be used to exchange data between devices without adding a device to network, it functions only at a distance of 10 cm or less, and in practice this distance is 4 cm or less. Near field communication (NFC) is a radio frequency identification (RFID) protocol that operates with RF fields in the near-field, operating at 13.56 MHz. It is a superset of the ISO14443 and ISO18092 protocols, including security features such as elliptic curve cryptography (ECC) and the advanced encryption standard (AES). NFC is also used to exchange configuration information for other wireless standards such as Bluetooth and Wi-Fi; many Bluetooth headsets now include NFC tags for provisioning purposes. The gesture of placing a NFC headset near a phone now carries digital associative meaning.

There are disadvantages of relying on NFC to configure another wireless system. First, there is additional cost associated with providing NFC function in a wireless device. In the situation where a mobile phone carries the NFC radio, this can add geometric volume for circuitry and antennas that may pose tradeoffs with other components in the system, such as battery life, design and wireless functionality. Second, as NFC uses two physical layer protocols that must be time-sequenced, some transactions involving security can take appreciably longer than standard user interface latency of less than 10 ms. Finally, not all interactivity for establishing communications can be done within 0-10 cm; the range of manipulation by a person is limited to reach of the arms, which is typically 0.3-1 m. There are also cases in which a person is stationary but can see another person or object he/she potentially would like to connect to; he/she could walk to this location, but the wireless device in principle could allow almost imperceptible time to exchange information, obviating the need for ambulation. The operation of a television is an example of this situation, but the communication is generally handled by connectionless infrared protocols, or pre-associated devices based on Bluetooth or Wi-Fi.

One method of exchanging data is through passwords or secret keys. Another method of exchanging data with lower burden on the user is through time synchronization of an interaction, in which the users of two or more devices press a button to open a small security hole for a short window of time and exchange security keys. Some existing mobile devices can exchange accelerometer signals recorded when users bump their phones together. The exchange of accelerometer signals allows the devices to then exchange information.

FIG. 1 is a diagram of a prior art communications system 100 to which various embodiments of the invention may be applied. (Similarly various embodiments of the invention may be applied to the prior art arrangements illustrated in FIGS. 2A, 2B, 2C, 2D, 3A, 3B, 3C, and 4 described below.) The communication system 100 includes a base station 102 and multiple wireless devices 104a, 104b, 104c and 104d. The base station itself may be of the same device type as the wireless devices (e.g., a wireless device may act as a base station for some or all communication transactions). The base station transmits an RF signal 106 received by the wireless communication devices. According to one embodiment, the base station 102 is connected to a power source. The power source may be an electrical outlet, battery, or other electrical source. The base station 102 may also include one or more network interfaces for coupling to one or more wired or wireless networks, including, for example, a Local Area Network (LAN), a Wireless Local Area Network (WLAN), a Wide Area Network (WAN), a cellular network or a Public Switched Telephone Network (PSTN). According to various embodiments, wireless communication devices 104a-104d may include one or more mobile phones, iPhones, headphones, headsets (including a microphone and earphone), music players, iPods, personal digital assistants, iPads, tablets, laptops, computers, cameras, or other types of devices.

FIG. 2A is a diagram of a pair of prior art communication devices communicating to each other via a narrowband communication system 200. Each device is using a local oscillator (LO) in the transmitter and receiver path, specifically, one device is using LO1 205 and the other device is using LO2 210. One of the devices may be (or act as) a base station and the other may be (or act as) a wireless device. Since the receiver of each device has a finite bandwidth, the devices share a channel plan indicating, within the accuracy and precision of their local clocks that generate their local oscillators (LOs), what channel two devices will share to communicate with each other. There may be multiple communication channels, to allow bandwidth sharing and channel robustness from external interferers. For example, the 2.4 GHz Wi-Fi band from 2.403 GHz to about 2.483 GHz has somewhere between 11 and 14 overlapping channels. When two devices share the same channel, they are able to communicate with each other with high data rate corresponding to a large channel bandwidth, and depending on the protocol, low latency as well. When two devices do not share the same channel, some amount of time elapses while they switch their local oscillators to the same channel. For example, in some systems, the time may vary from about 100 μs to several milliseconds. There also may be protocol-level latency associated with changing channels, such as the latency associated with beacon or advertising frames of data. If the transceiver of a device switches several times before occupying the same channel as the other device, this process may take several milliseconds to seconds.

FIG. 2B is an example showing a time domain waveform of an RF signal and waveforms of the same signal after detection using respectively a broadband detector 235b and a narrowband detector 240b. In this example, a transmitter from 205 modulates data using phase reversal amplitude shift keying (PR-ASK) modulation, typically used by the GS1/EPCG Global Gen2 or ISO18000-6C RFID protocol. The 0 and 1 bits are encoded using different time durations, with the bit sequence 010011 encoded in this example. The RF modulation 225b and a zoomed in version 230b show the RF cycles at 915.0 MHz. The RF signal 225b from the transmitter signal is detected both by a transceiver 210 using a broadband detector and by a separate, independent transceiver 210 using a narrowband detector. The broadband detector waveform 235b results from using a diode and single-pole low-pass filter envelope detector; the detected signal 235b from the broadband detector is similar to the source waveform 220b, but has some unfiltered and distorted parts of the original RF signal as a result of the nonlinearity of the detector and the characteristics of the single-pole filter. Nevertheless, the signal fidelity is more than adequate to extract the original bit sequence. The waveform 240b, resulting from application of the original RF signal to the narrowband detector, is an undistorted representation of the original waveform 220b, because the local oscillator (LO) of the narrowband detector closely matches the source (they are on the same channel). The high signal fidelity allows ready extraction of the original bit sequence.

FIG. 2C is an example similar to FIG. 2B, with the addition of a continuous wave (CW) interfering signal that is one channel higher (+10 MHz) than the transmitter. The amplitude of the interfering signal is ½ (that is, 3 dB below) that of the transmitter signal. The source signal with interference 225c is shown relative to the original envelope 220c from the transmitter. The broadband detected signal 235c shows additional distortion, as the entire waveform including interference passes through the nonlinearity and single-pole filter. If the detector has a variable gain and/or variable threshold, the original bit sequence might still be extracted, but with potentially higher bit error probability. As the interferer amplitude increases above ½ or −3 dB, the receiver will no longer be able to extract the bit pattern. But, as interferers remain further away from the broadband RF receiver than the transmitter, it is possible for data to be reliably extracted from the broadband RF receiver, as is done with RFID tags based on the GS1/EPCG Global Gen2 or ISO18000-6C RFID protocol. With a channel filter on the narrowband detector, the narrowband detected signal 240c is identical to 240b, and the interference is eliminated from the narrowband detector.

FIG. 2D is an example similar to FIG. 2B, except the LO of the transmitter from 205 is changed to the next channel, 10 MHz above 915.0 MHz. For the broadband detector, the detected signal is relatively independent of the LO frequency, and therefore the detected envelope 235d is essentially equivalent to 235b. The signal fidelity of the waveform 235d is more than adequate to extract the original bit sequence. For the narrowband detector with an LO of 915.0 MHz, as in the original example, the channel filter rejects the transmitted signal due to a LO mismatch. The waveform 240d is absent. It is possible there may be sufficient dynamic range in the narrowband receiver to recover the original data sequence, but major structural changes in the modem of the receiver may be required to manage the significant LO mismatch. There is an explicit tradeoff between channel rejection and the instantaneous acquisition of information between narrowband devices.

FIG. 3A is a time sequence diagram of a prior art arrangement wherein a client is connecting to an access point (AP) using the 802.11 protocol, using either Direct Sequence Spread Spectrum (DSSS) or Orthogonal Frequency Division Multiplexed (OFDM) modulation. The base station and client both operate narrowband transceivers that utilize oscillators and must choose a channel in the 2.4 and/or 5 GHz band to operate in. The base station sets its local oscillator to a CH1, which will be a specific frequency that is specific to a specific country of operation. For example, in the United States, there are 11 channels, starting at 2412 MHz (CH1) up to 2462 MHz (CH11). In the example shown in FIG. 3A, the client, trying to connect to an AP, sets its local oscillator LO2 to CH5. Since the Beacon packet from the AP, which are used to provide information to clients to connect to the AP, are on CH1, the client at CH5 does not see the Beacon packet. If there are no collisions on the channel, the AP will typically transmit Beacon packets every 100 ms. If there are collisions, this interval could be a multiple of 100 ms. The client, not seeing a Beacon frame, must jump to another channel to find a Beacon frame. In the worst possible case without collisions, with 11 channels, going to the same channel of the AP could take up to 11.times.100 ms=1.1 s, with an average of 6.times.100 ms=600 ms. When collisions are considered, this is the reason it can take several seconds for a client to see an intended AP. In a client to client (or peer to peer) model such as Wi-Fi Direct, the same structure of establishing data communications is required, as one client must play the role of AP and the other client must match to the channel of the other client. If multiple users greater than 2 would like to connect, the time for all clients to be connected can grow substantially.

FIG. 3B is a time sequence diagram of a prior art arrangement wherein a peripheral is connecting to a central system using the BTLE protocol, where the protocol specifies FHSS for the channel sharing algorithm. In this protocol, three of the total 40 channels in the range of 2402-2480 MHz are advertising channels for other devices, while the remaining 37 channels are for data. In the example shown, the central system sets its local oscillator to channel 38 or 2426 MHz, one of the advertising channels, while the peripheral tries to establish communications on channel 37 or 2402 MHz. The peripheral provides an ADV_DIRECT_IND packet to look for a central system to establish communications with, but because the two narrowband devices are not on the same channel, they are not able to see each other. By being on the incorrect channel, up to 10 ms could elapse before the peripheral switches channels. Then the peripheral chooses another channel, either in a static algorithmic or table-driven way, to channel 38. This channel is now the same channel as the central system, and therefore the ADV_DIRECT_IND message sent by the peripheral can be heard by the central system if there is a sufficient SINR. The central system responds with a SCAN_REQ response, and is now able to send packets to the peripheral. In this example, the time for the peripheral to connect to the central system is under 20 ms, but in general, with 3 advertising channels, connection time could be under 10 ms, under 20 ms, or under 30 ms. With a connection time on average of 20 ms, this is a short time on human perceptible scales, but could potentially be shorter to allow more data to be transmitted during this interval.

FIG. 3C is a time sequence diagram of a prior art arrangement wherein a GS1/EPCG Global Gen2 or ISO18000-6C RFID reader is communicating with a Gen2 or ISO18000-6C RFID tag using a broadband transceiver on the tag. The tag is capable of operating over a worldwide frequency range of 860-930 MHz. The tag can either be powered by the RF field itself, termed a passive tag, or a local power source such as a battery, and it is termed a semi-passive RFID tag. The choice of power source in the embodiment of the Gen2 of ISO18000-6C protocol does not change the timing of the system, but increases the receiver sensitivity of the tag, enabling longer distance communications. Regardless of the power source, an RFID reader communicates with a RFID tag using amplitude modulation, and the tag communicates to the RFID reader using backscatter amplitude modulation. In some embodiments, the amplitude modulation is double sideband amplitude shift keying (DSB-ASK), phase reversal amplitude shift keying (PR-ASK) or single sideband amplitude shift keying (SSB-ASK). When the tag backscatters, the RFID tag generates a reflection of a partial component of the interrogating RF wave. By varying the impedance of the circuitry presented to its antenna, the RFID tag can modulate in a time-sequenced manner the amount of the partial component to communicate information. The receiver of the RFID reader is capable of extracting this partial component as an amplitude shift keyed signal. In a backscatter system, the tag does not generate or use its own local oscillator (LO); it simply communicates ASK data on the RF wave originating from the reader, as described above. This means there is no carrier synchronization required, but the tradeoff is that the path loss from the reader to the tag and back is at least double the path loss of a traditional active radio system. Therefore, the explicit tradeoff of a backscatter system with an active transmitter is that the path loss is double for the backscatter system, but the latency on any channel is significantly lower on average than an active radio system.

In the example shown in FIG. 3C, the RFID tag is able to extract power from the RF field of the reader, and therefore the Power State replaces the Local Oscillator state in this time sequence. Immediately after the reader has settled its local oscillator, it transmits CW for a time required of the protocol to turn the Power State of the tag to ON from the OFF state. The reader can then immediately modulate its RF transmitted wave to send data to the RFID tag and the tag can interpret the data. Finally, the tag processes the information sent by the reader and responds with a backscatter response to the reader information. In the EPCG/GS1 protocol, the time that a reader can communicate with a tag varies with the bit time of the transmitter and the bit time of the tag. For the example where the bit-0 time, or Tari is 6.25 µs, and the Backscatter Link Frequency (BLF) of the RFID tag is 640 KHz with FM0 modulation, the time for the reader to obtain 96-bits of information in addition to a 16-bit random number, 16-bits of protocol control bits and a 16-bit cyclic redundancy check (CRC) is approximately 2.5 ms, with each incremental packet from an RFID tag being approximately 1.0 ms. If the BLF is 400 kHz, this time is approximately 2.7 ms, with each incremental packet from an RFID tag being approximately 1.2 ms. If the BLF uses a Miller modulation with M=4 and a BLF of 256 kHz, the time is approximately 4.8 ms, with each incremental packet from an RFID tag being approximately 3.2 ms. In practice, if there are many tags in the field, the rate of incremental packet acquisition can be slowed down by the efficiency of a slotted ALOHA protocol, typically e, the base of the natural logarithm, or 2.72 times slower than the numbers described above. Also in practice, channel noise may slow down the rate of acquisition of data from the RFID tags, as would be true of any RF protocol. Nevertheless, in practice, the connection time for a broadband receiver system used in this example is capable of being significantly faster than the Wi-Fi or Bluetooth examples above.

FIG. 4 is a schematic diagram of the transceiver portion of a conventional mobile communications device 400. On the transmitter side, a modem 450 generates a set of digital signals that are converted into an analog baseband signal by the transmit baseband 425. After digital-to-analog conversion in the transmit baseband 425, low pass filtering may be implemented in this block. An I&Q modulator 420 mixes the local oscillator signal 430 with the transmit baseband signals, typically combines them into a single output, to produce modulation at the intended radio frequency. The I&Q modulator 420 may be composed of analog mixers, buffers, amplifiers, and filters. This signal is filtered, amplified 415 and then switched 410 through one or more antennas 405. On the receive side, a received signal comes through one or more switched antenna elements 410, which are amplified by a low-noise amplifier (LNA) 435, and then converted to baseband via an I&Q demodulator 440. The LNA 435 and I&Q demodulator 440 may optionally include a peak detector for channel power measurements or for automatic gain control (AGC). Like the I&Q modulator 420, the I&Q demodulator 440 may be composed of analog mixers, buffers, amplifiers, and filters. The generated I&Q analog baseband signals are processed by a series of amplifiers, analog-to-digital converters and processed using a series of digital operations that make up the receive baseband 445, to produce a digital stream that is received by the modem MAC 450. Many types of radios such as Bluetooth, Wi-Fi, GSM, RFID readers may operate in this manner at a high level, but perhaps with multiple independent transmit and receive subcomponents.

SUMMARY OF PARTICULAR EMBODIMENTS

In particular embodiments, a broadband receiver of a wireless communications device may poll a broadband communications channel for configuration data. Once the configuration data has been received, the channel may be established, and connection information may be transmitted to a base station. The connection information may be an identifier for a user of a social-networking system. Based on the identifier, the device may be able to establish a narrowband communications channel with the base station. Using the identifier, the base station may be able to begin retrieving social-networking information for the user while establishing a communications channel using the narrowband transceiver. Once the narrowband communications channel has been established, the wireless communications device may be able to receive the social-networking information over that channel.

Once the narrowband communications channel has been established, the base station may be able to facilitate social-networking-related functions for the user, such as, by way of example and not limitation, serving targeted advertising to the user, performing automatic check in of the user, providing customized TV programming to the user based on their user profile, or determining whether the user is authorized to access the narrowband communications channel.

In particular embodiments, the connection information may comprise a password or a secret key for the user. In particular embodiments, the device may open an unsecured communications port for a short window of time to exchange security keys with the base station. In particular embodiments, two or more wireless communications devices may each comprise an accelerometer, wherein the digital signal comprises an accelerometer signal, and wherein they each transmit their respective connection information by "bumping" the devices together (e.g., an exchanged accelerometer signal).

BRIEF DESCRIPTION OF THE DRAWINGS

The foregoing features of embodiments will be more readily understood by reference to the following detailed description, taken with reference to the accompanying drawings, in which.

It should be noted that the foregoing figures and the elements depicted therein are not necessarily drawn to consistent scale or to any scale. Unless the context otherwise suggests, like elements are indicated by like numerals.

DESCRIPTION OF EXAMPLE EMBODIMENTS

Figure 1:
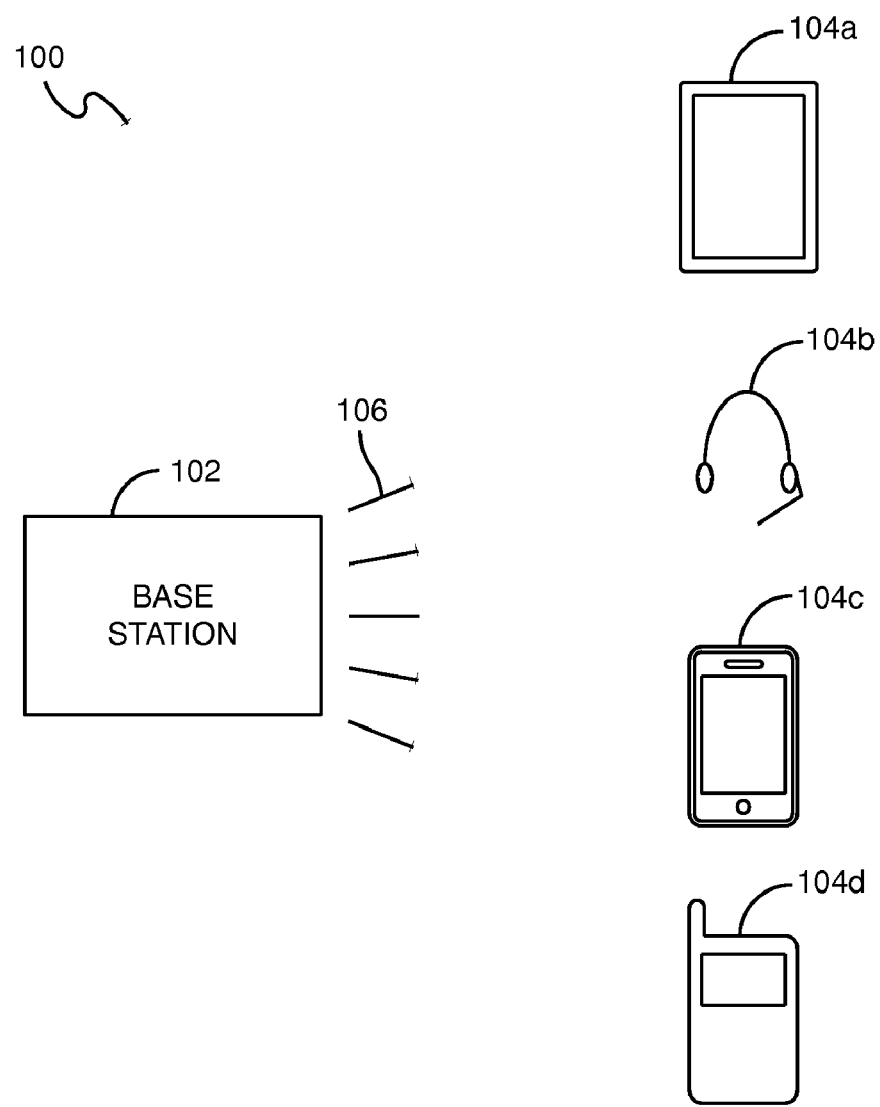
FIG. 1 is a diagram of a prior art communications system 100 to which various embodiments of the invention may be applied.
Figure 2A:
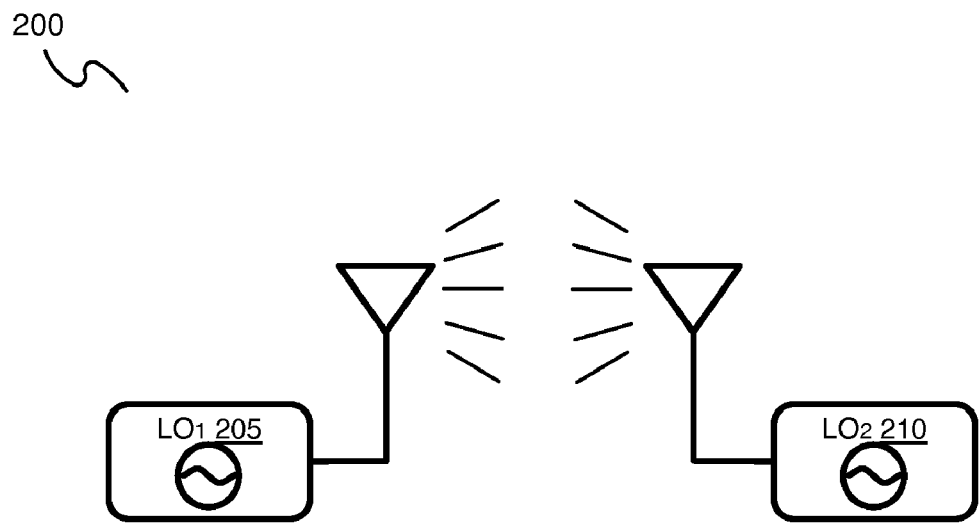
FIG. 2A is a diagram of a pair of prior art communication devices communicating to each other via a narrowband communication system 200.
Figure 2B:
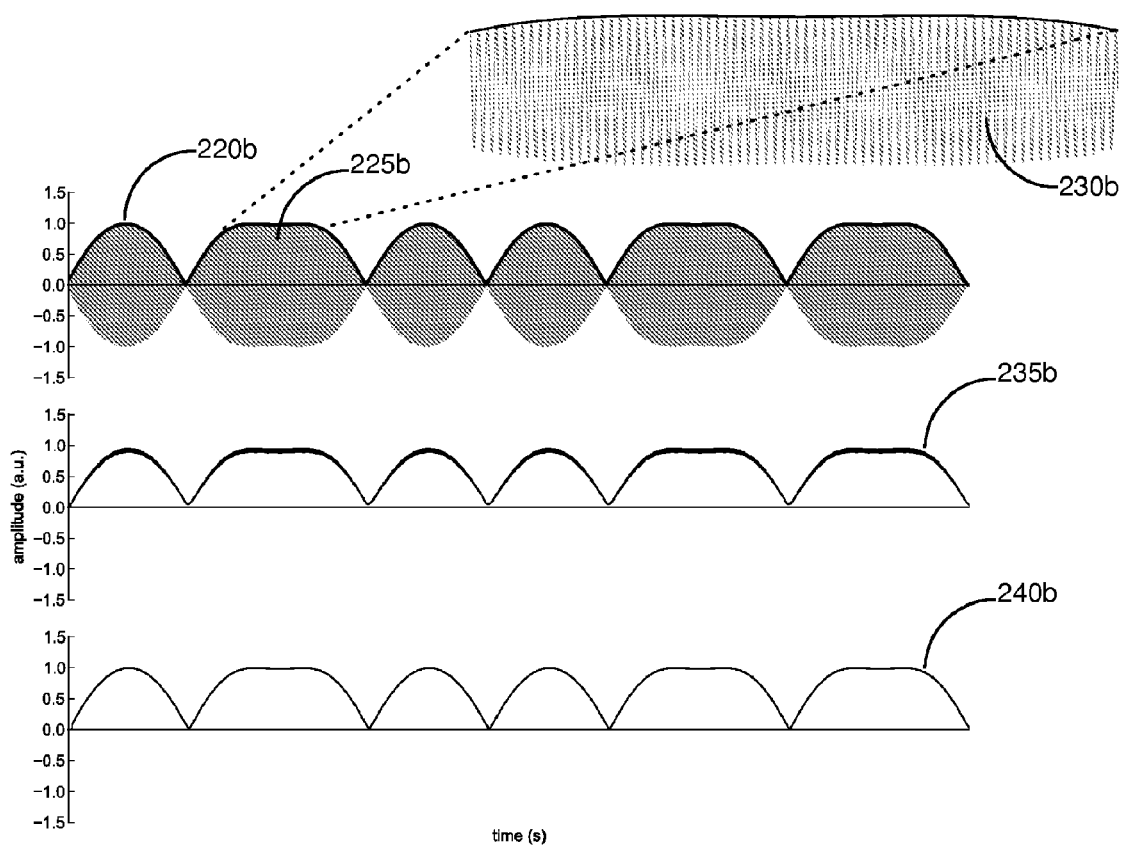
FIG. 2B is an example showing a time domain waveform of an RF signal and waveforms of the same signal after detection using respectively a broadband detector and a narrowband detector.
Figure 2C:
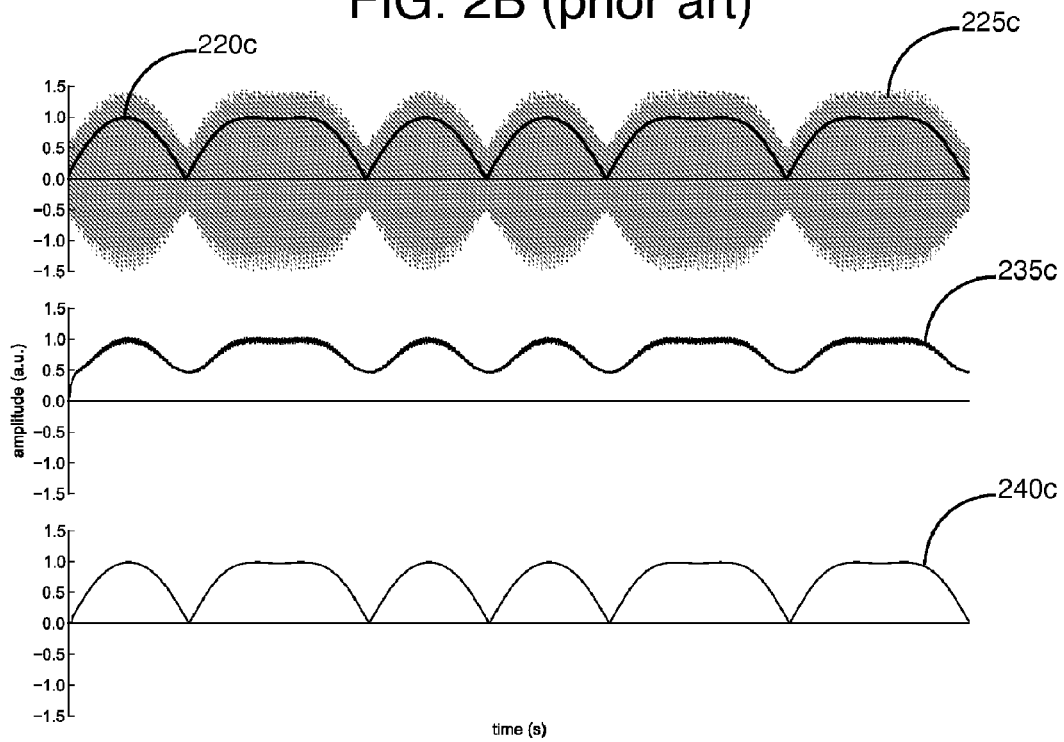
FIG. 2C is an example similar to FIG. 2B, with the addition of a continuous wave (CW) interfering signal that is one channel higher (+10 MHz) than the transmitter.
Figure 2D:
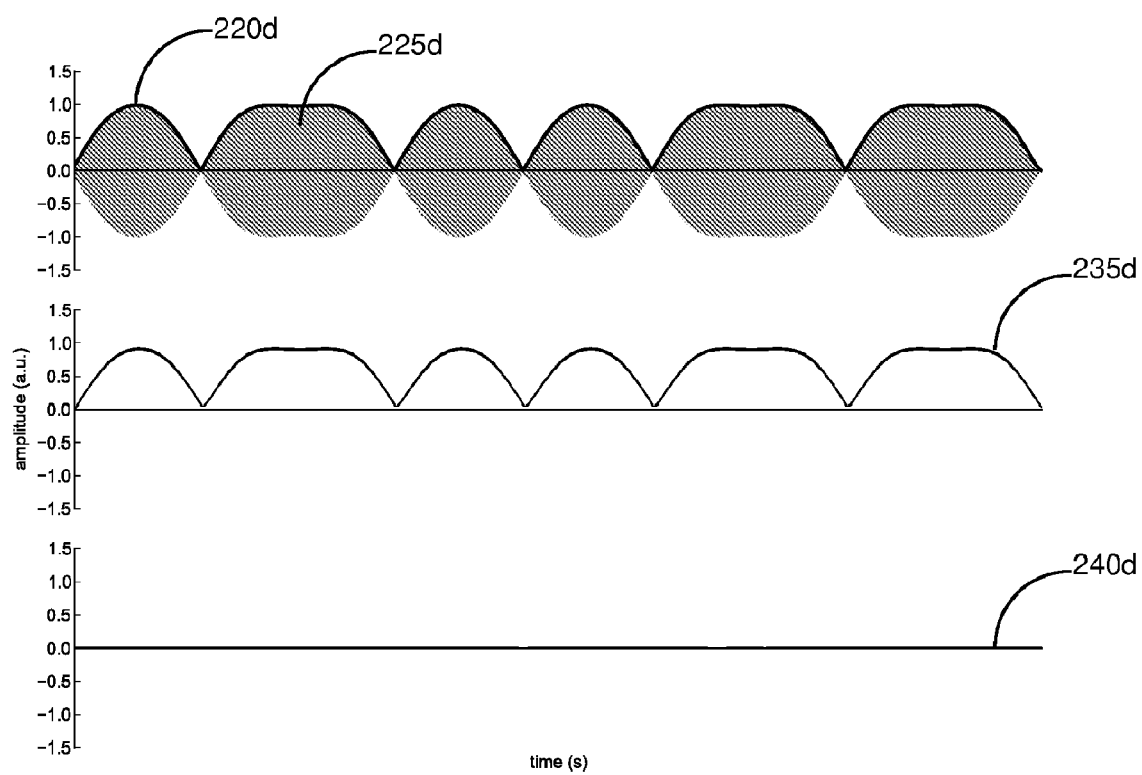
FIG. 2D is an example similar to FIG. 2B, except the LO of the transmitter from 205 is changed to the next channel, 10 MHz above 915.0 MHz.

In a first embodiment of the invention there is provided an improved mobile communications device of the type having a set of antennas, and a narrowband RF transceiver coupled to a first member of the set of antennas. In this embodiment, the improvement includes a broadband amplitude-shift-key receiver, coupled to a second member of the set of antennas, to produce a digital signal; and processing circuitry, coupled to the narrowband RF transceiver and the broadband amplitude-shift-key receiver, that processes the digital signal to determine a communications channel for the narrowband RF transceiver and to set a frequency of the narrowband RF transceiver to correspond to the determined communications channel.

Optionally, the narrowband RF transceiver is one of a Wi-Fi transceiver, a Bluetooth transceiver, a GSM transceiver, a CDMA transceiver, or an RFID transceiver. Optionally, the narrowband RF transceiver is configured to transmit both amplitude-shift-keyed RF signals for a broadband RF receiver and narrowband RF signals. Optionally, the device further includes an amplitude-shift-key transmitter for a broadband receiver separate from the narrowband RF transceiver. Optionally, the device further includes a backscatter amplitude-shift-key transmitter coupled to the processing circuitry, the backscatter amplitude-shift-key modulator allowing for broadband transmissions in response to the digital signal while the frequency of the narrowband RF transceiver is being set. Optionally, the device further includes a plurality of antennas; and a switching matrix, coupled to the plurality of antennas and to the narrowband RF transceiver and the broadband amplitude-shift-key RF receiver, that selectively couples each of the narrowband RF transceiver and the broadband amplitude-shift-key receiver to either identical sets or distinct sets of the antennas. Optionally, the processing circuitry is configured to monitor the narrowband RF transceiver and the broadband amplitude-shift-key receiver in parallel for received information relevant to operation of the narrowband RF transceiver, and wherein the processing circuitry is configured to determine a communications channel for the narrowband RF transceiver and to set a frequency of the narrowband RF transceiver based on information received from the broadband amplitude-shift-key RF receiver when relevant information is received from the broadband amplitude-shift-key RF receiver before relevant information is received from the narrowband RF transceiver. Also optionally, the digital signal includes at least one of source device identification information, destination device identification information, channel identification information, security information, symbol rate information, error correction information, channel equalization information, timing information, protocol information, physical layer information, medium access control layer information, data link layer information, network layer information, or application information.

In another embodiment, the invention provides a method of selecting a communications channel for a narrowband RF transceiver in a mobile communications device. In this embodiment, the method includes: receiving an input RF signal at the mobile communications device, the input RF signal being encoded using an amplitude-shift-keyed modulation scheme; demodulating the input RF signal using broadband amplitude-shift-keyed demodulation to obtain a digital signal; processing the digital signal to determine the communications channel; and setting a frequency of the narrowband RF transceiver to correspond to the determined communications channel.

Optionally, the narrowband RF transceiver is one of a Wi-Fi transceiver, a Bluetooth transceiver, a GSM transceiver, a CDMA transceiver, or an RFID transceiver. Optionally, the method further includes monitoring the narrowband RF transceiver and the broadband amplitude-shift-key RF receiver in parallel for received information relevant to operation of the narrowband RF transceiver. Optionally, the method further includes responding to the input RF signal using a backscatter amplitude-shift-key transmitter while the frequency of the narrowband RF transceiver is being set. Optionally, the digital signal includes at least one of source device identification information, destination device identification information, channel identification information, security information, symbol rate information, error correction information, channel equalization information, timing information, protocol information, physical layer information, medium access control layer information, data link layer information, network layer information, or application information.

In another embodiment, the invention provides an improved mobile communications device of the type having a set of antennas and a narrowband RF transceiver coupled to a first member of the set of antennas. In this embodiment, the improvement includes a broadband RF receiver coupled to a second member of the set of antennas; and processing circuitry, coupled to the narrowband RF transceiver and the broadband RF receiver, that uses a received signal from the broadband receiver to determine a communication parameter for the narrowband RF transceiver.

Optionally, the narrowband RF transceiver is one of a Wi-Fi transceiver, a Bluetooth transceiver, a GSM transceiver, a CDMA transceiver, or an RFID transceiver. Optionally, the narrowband RF transceiver is configured to transmit both amplitude-shift-keyed RF signals for a broadband RF receiver and narrowband RF and broadband amplitude-shift-keyed signals. Optionally, the device further includes a broadband RF transmitter for a broadband RF receiver separate from the narrowband RF transceiver. Optionally, the device further includes a backscatter transmitter coupled to the processing circuitry, the backscatter modulator allowing for broadband transmissions in response to the digital signal while the communication parameter for the narrowband RF transceiver is being set. Optionally the device further includes a plurality of antennas; and a switching matrix, coupled to the plurality of antennas and to the narrowband RF transceiver and the broadband RF receiver, that selectively couples each of the narrowband RF transceiver and the broadband RF receiver to an antenna. Optionally, the processing circuitry is configured to monitor the narrowband RF transceiver and the broadband RF receiver in parallel for received information relevant to operation of the narrowband RF transceiver, and wherein the processing circuitry is configured to set a communication parameter for the narrowband RF transceiver based on information received from the broadband RF receiver when relevant information is received from the broadband RF receiver before relevant information is received from the narrowband RF transceiver. Optionally, the digital signal includes at least one of source device identification information, destination device identification information, channel identification information, security information, symbol rate information, error correction information, channel equalization information, timing information, protocol information, physical layer information, medium access control layer information, data link layer information, network layer information, or application information. Optionally, the communication parameter includes at least one of a frequency for narrowband RF communication, a channel for narrowband RF communication, a security parameter for narrowband RF communication, or a connection token for narrowband RF communication.

In another embodiment, the invention provides a method of configuring a communication parameter for a narrowband RF transceiver in a mobile communications device. The method of this embodiment includes: receiving an input RF signal at the mobile communications device, the input RF signal being encoded using a first modulation scheme; demodulating the input RF signal using broadband RF demodulation to obtain a digital signal; processing the digital signal to determine a communication parameter for the narrowband RF transceiver from the digital signal; and setting the communication parameter for the narrowband RF transceiver.

Optionally, the narrowband RF transceiver is one of a Wi-Fi transceiver, a Bluetooth transceiver, a GSM transceiver, a CDMA transceiver, or an RFID transceiver. Optionally, the method further includes monitoring the narrowband RF transceiver and the broadband RF receiver in parallel for received information relevant to the communication parameter. Optionally, the method further includes responding to the input RF signal using a backscatter transmitter while the communication parameter for the narrowband RF transceiver is being set. Optionally, the digital signal includes at least one of source device identification information, destination device identification information, channel identification information, security information, symbol rate information, error correction information, channel equalization information, timing information, protocol information, physical layer information, medium access control layer information, data link layer information, network layer information, or application information. Optionally, the communication parameter includes at least one of a frequency for narrowband RF communication, a channel for narrowband RF communication, a security parameter for narrowband RF communication, or a connection token for narrowband RF communication.

DEFINITIONS

As used in this description and the accompanying claims, the following terms shall have the meanings indicated, unless the context otherwise requires:

A mobile communications device is one of (1) a portable wireless communications device that includes a narrowband transceiver or (2) a base station device that can communicate with such a portable wireless communications device. A portable wireless communications device optionally may be configured to communicate with another such portable wireless communications device. A base station device optionally may be implemented by a portable wireless communications device.

A "set" has at least one member.

The term "broadband" refers to a wireless communication technology that utilizes an envelope detector in the receiver for communication. Broadband communication transmitters can utilize amplitude modulation (e.g., amplitude shift keying), phase modulation (e.g., phase shift keying), or frequency modulation (e.g., frequency shift keying). Some RFID tag technologies, for example, use broadband communication.

The term "narrowband" refers to a wireless narrowband communication technology that utilizes a heterodyne detector in the receiver for communication. Examples include Bluetooth, Wi-Fi, GSM, and certain RFID reader technologies.

As discussed above, there can be a substantial amount of latency for two devices to connect with one another for communication over a narrowband communication system. Therefore, in embodiments of the present invention, the devices additionally use broadband communications for virtually immediate communication between devices when the devices are in proximity with one another. While broadband communication may be used for an entire communication session between the devices (which may be one-way from a base station device to another device, or may be bi-directional between the devices), more typically broadband communication will be used to pass information that allows the devices to quickly establish communication over the narrowband communication system without the latency caused by the frequency hopping, handshaking, or other delays in the narrowband communication system. For example, the devices can use broadband communication to convey such things as device identification information (e.g., a source device address, a destination device address), channel identification information, security information (e.g., encryption parameters), symbol rate information, error correction information, channel equalization information, timing information, protocol information, physical layer information, medium access control (MAC) layer information, data link layer information, network layer information and/or other information. Based on the information passed between the devices via broadband communication, the devices can quickly establish communication over the narrowband communication system and then switch over from broadband communication to narrowband communication. For example, the base station may pass a channel number to the mobile communications device, allowing the mobile communications device to go immediately to the channel for communication with the base station over the narrowband communication system.

The combined use of broadband detection and narrowband detection allows one to communicate with a nearby device in parallel with established communications methods. It allows maintenance of high bandwidth communication, but can significantly improve latency. Broadband communication does not possess the sensitivity to receive messages that can be obtained from narrowband communications, and therefore the latency will improve relative to a system without a broadband receiver, but will only provide a benefit for a wireless device within a certain communication range of another device. One property of this type of demodulator is that regardless of the channels occupied by two devices trying to connect with each other using broadband ASK detection, the two devices are able to commence communication immediately through the broadband channel.

Although the present invention is not limited to a particular broadband wireless communication technology, in certain specific embodiments, broadband amplitude-shift-keyed (ASK) technology of the type used in many radio frequency identification (RFID) systems is employed. Broadband ASK detection allows one device to communicate with a nearby device in parallel with established communications, but it does not possess the sensitivity to receive messages from devices that have path losses that are too great. Thus, the devices must be in relatively close proximity to one another to communicate via broadband. The use of RFID-based broadband communication allows for virtually immediate communication between the devices, and also can allow the devices to communicate with other RFID devices, such as RFID tags.

Figure 3A:
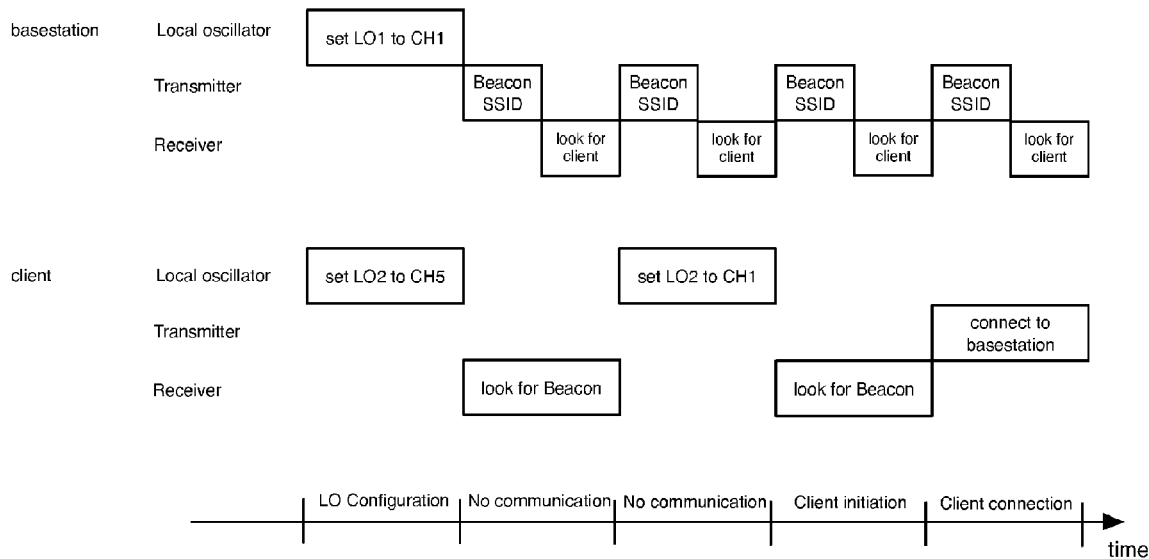
FIG. 3A is a time sequence diagram of a prior art arrangement wherein a client is connecting to an access point (AP) using the 802.11 protocol, using either Direct Sequence Spread Spectrum (DSSS) or Orthogonal Frequency Division Multiplexed (OFDM) modulation.
Figure 3B:
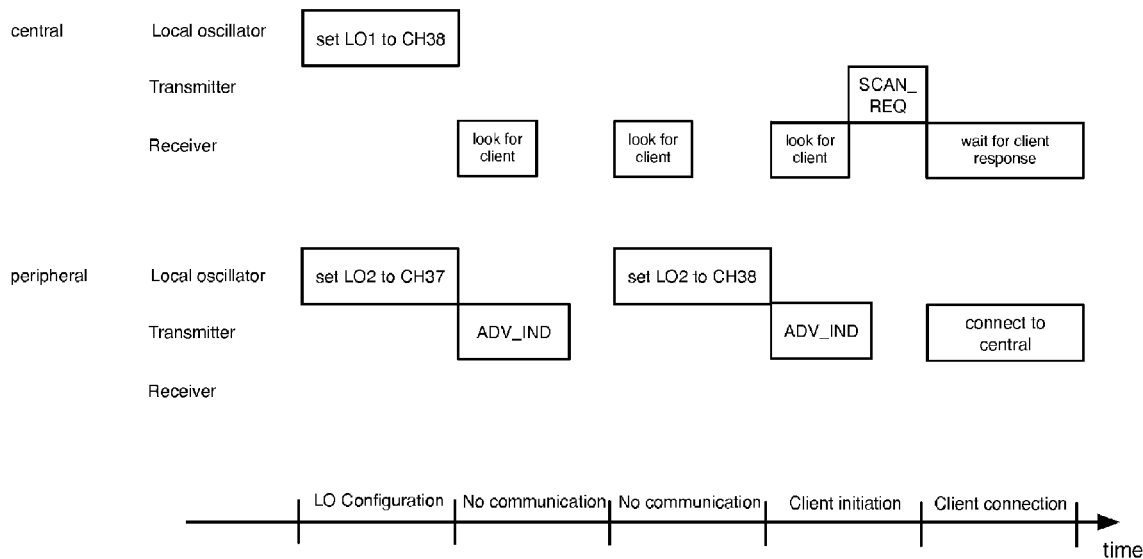
FIG. 3B is a time sequence diagram of a prior art arrangement wherein a peripheral is connecting to a central system using the Bluetooth Low Energy (BTLE) protocol, where the protocol specifies FHSS for the channel sharing algorithm.
Figure 3C:
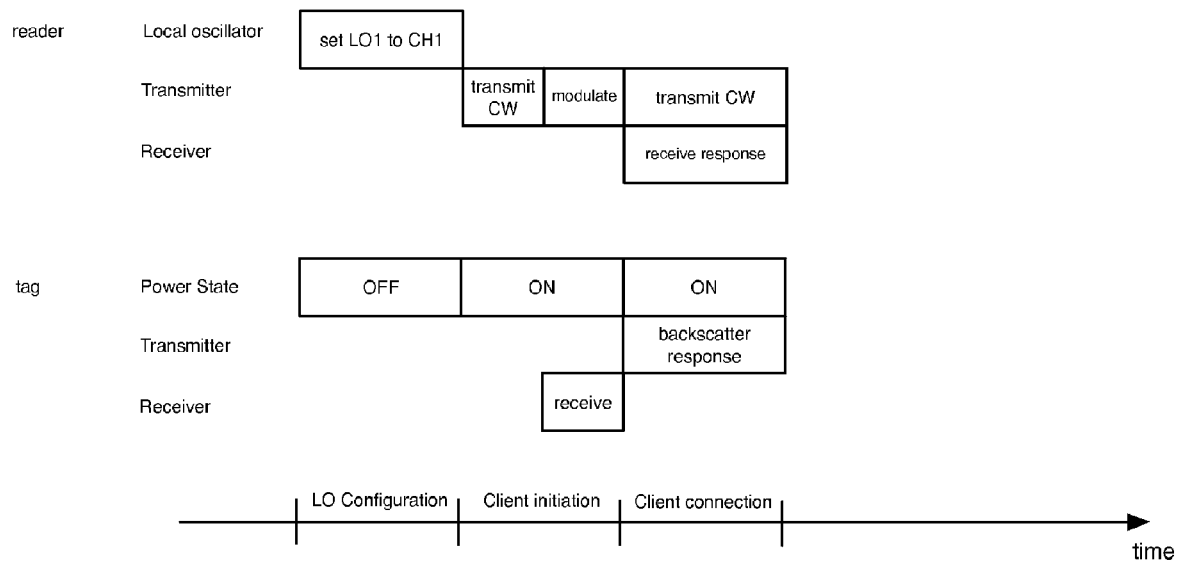
FIG. 3C is a time sequence diagram of a prior art arrangement wherein a GS1/EPCG Global Gen2 or ISO18000-6C RFID reader is communicating with a Gen2 or ISO18000-6C RFID tag using a broadband transceiver on the tag.
Figure 5A:
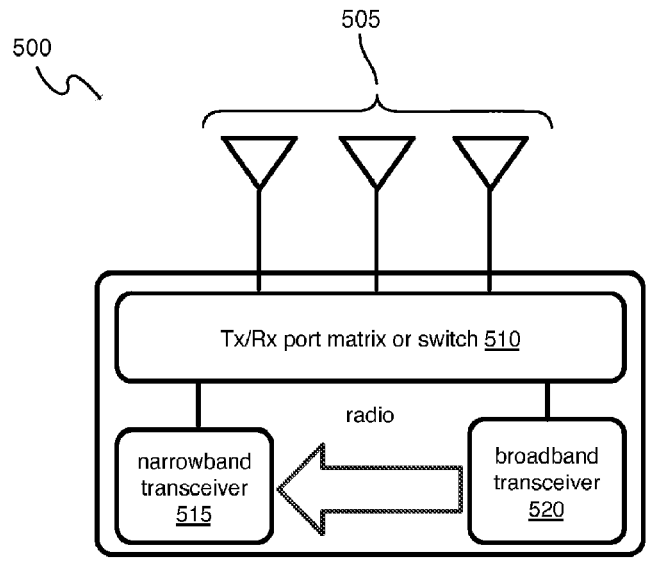
FIG. 5A is a high-level schematic block diagram of a device 400 in accordance with an exemplary embodiment of the present invention.

FIG. 5A is a high-level schematic block diagram of a device 500 in accordance with an exemplary embodiment of the present invention. To address the issue of minimizing latency of a narrowband communication system, embodiments of this invention incorporate a broadband radio transceiver 520 that is connected to a set of antennas 505 via a transmit/receive port matrix or switch 510. The bandwidth of the broadband transceiver 520 could either be wider, equal or narrower than the bandwidth of the antennas 505. A broadband transceiver using RFID communication technology (e.g., as shown in FIG. 3C) can be used to ensure that a device using a narrowband transmitter can communicate immediately with another wireless communication device. Rather than limit clients to be RFID tags, embodiments may incorporate the front end of an RFID tag into the narrowband radio. This incorporation may be done as a circuit board assembly of multiple discrete or integrated designs, or the narrowband and broadband transceivers may be integrated into the same integrated circuit (IC). When the broadband transceiver 520 receives and processes information that may be of relevance to the narrowband transceiver, it transfers this information to the narrowband transceiver 515. In one embodiment, this information may be physical layer information such as the channel the narrowband transceiver 515 should connect to, as would be used in Wi-Fi or Bluetooth communications. In other embodiments, this information may be symbol rate information, error correction information or channel equalization information for configuration of the physical layer. In other embodiments, this information may be timing information for the Media Access Controller (MAC) that could be useful for time synchronization or power management. In yet other embodiments, this information could be information relevant to other layers of the OSI model, such as data link information, security keys and protocols, IP and other network protocol information, or application information.

Figure 5B:
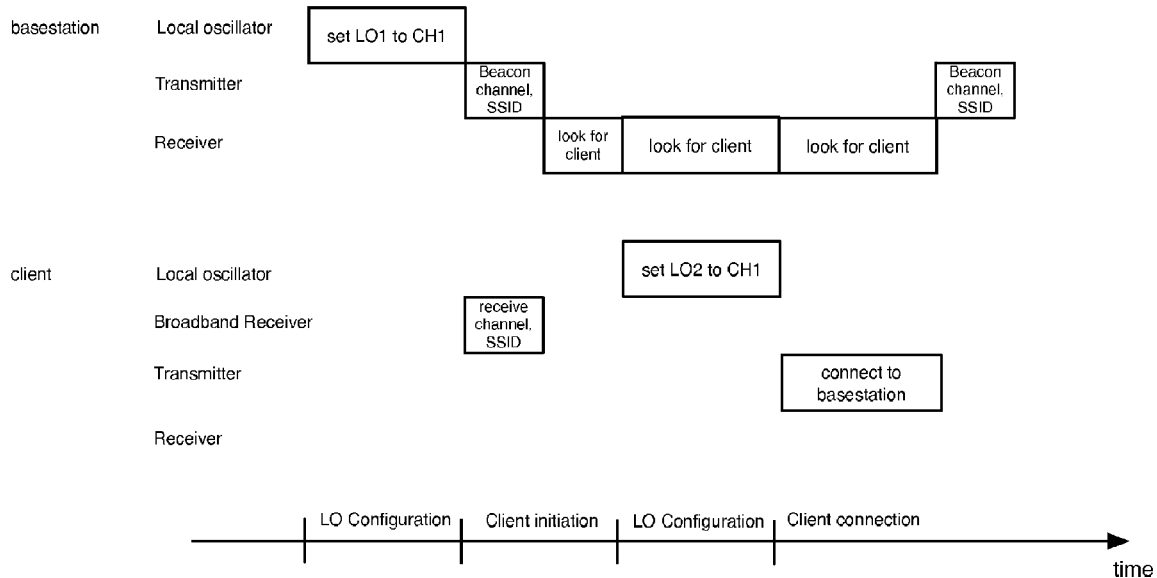
FIG. 5B is a time sequence of a Wi-Fi embodiment on this invention using a broadband receiver on the client to receive an ASK or PSK-modulated signal from the base station.

FIG. 5B is a time sequence of a Wi-Fi embodiment on this invention using a broadband receiver on the client to receive an ASK or PSK-modulated signal from the base station. This modulated RF waveform from the base station is received by the broadband transceiver of the client and informs the active radio of the channel and SSID of the base station AP to connect to. By combining a broadband transceiver with a narrowband transceiver, this invention aims to minimize the latency of establishing narrowband, robust active radio communication. It should be noted that if a peer to peer system is required, both the base station and clients could possess transmitters that are capable of ASK modulation and broadband receivers; a broadband receiver is shown on the client only to simplify the figure and explanation of the invention. The base station sets the LO of its narrowband transceiver to channel 1, then modulates its RF transmitted signal with an ASK Beacon packet that contains its channel (CH1) and SSID. Because the client possesses a broadband receiver, it is able to receive this information regardless of the channel that the base station is on. The client is able to set its LO to CH1, then connect to the base station. This would ensure that in this extension of the Wi-Fi standard, a nearby client would only be required to wait a maximum of 100 ms to be able to connect to the base station, six times faster than without a broadband receiver. Optionally, the broadband transceiver could include a backscatter ASK modulation component, as is found in RFID tags, to respond to the ASK Beacon packet while the LO is being changed in parallel. If the client is further than the range where the broadband receiver can interpret the modulated data, the client can default to the original standard algorithms outlined in FIG. 3A. For point of reference, the state of the art for a broadband powered receiver is about −34 dBm for a battery-assisted passive RFID tag, compared to about −92 dBm for a Wi-Fi radio.

As prior art for systems that minimize latency for narrowband communication, some systems use the NFC HF RFID protocol to enable faster configuration of Bluetooth and Wi-Fi networks, reducing latency. This is a similar idea to that posed here, where a broadband HF radio with a separate antenna communicates with a client to reconfigure a UHF or microwave radio. In the embodiment of this invention, the broadband and narrowband transceivers share a plurality of antennas, and can share much of the same transceiver analog and digital components. This allows a reduction of cost, as no new antennas or switches or extra analog or digital components are required. This invention also allows far-field communication; a typical operating distance for NFC is a maximum of 10 cm, and often 1-4 cm, while for a UHF or microwave backscatter system, this communication distance can be typically 1-20 m. With this invention, a substantially larger and usable communication distance can be used to reduce the latency of the narrowband transceiver. With the NFC protocol, this is an umbrella protocol for two incompatible physical layer protocols: ISO14443 A/B; and ISO18092. With two physical layer protocols, a substantial amount of time (up to 1 s) of security overhead and protocol switching time is much longer than what could be potentially implemented with a UHF or microwave protocol based on EPCG/GS 1 UHF Gen2, derivatives therein, or a custom protocol created for these specific applications. Thus the cost, area and time savings of this invention relative to the state of the art could provide substantially better operating points and applications of wireless communication technology.

Figure 5C:
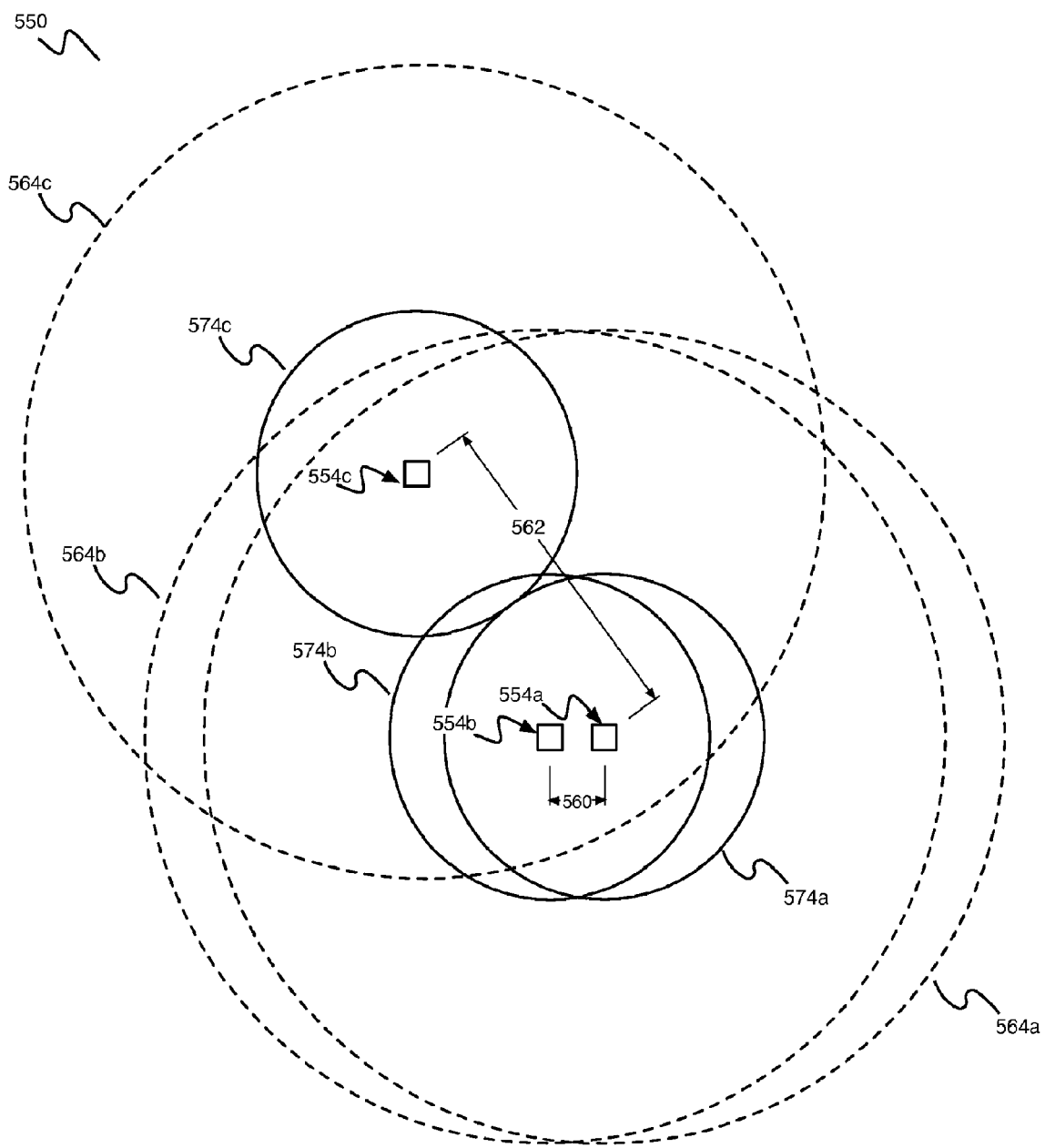
FIG. 5C is a schematic diagram showing communication modalities among three wireless clients 554a, 554b, and 554c using both narrowband transceivers and broadband transceivers.

FIG. 5C is a schematic diagram showing communication modalities 550 among three wireless clients 554a, 554b, and 554c using both narrowband transceivers and broadband transceivers. Client 554a has a narrowband communication range shown as 564a, dependent on the transmit power of 554a and the receive sensitivity of 554b and 554c. The receive sensitivities of transceivers in clients 554a-c will be dependent on the fundamental data rate, channel capacity, implementation margin and level of interference in the environment. As shown in FIG. 5C, clients 554b and 554c are able to receive messages from 554a through narrowband communications, as the distances 560 and 562 from 554b and 554c to 554a respectively are shorter than the communication range 564a from 554a. And for the sake of illustration, if we assume the transmitter and receiver sections of the transceivers of clients 554b and 554c have the same operating and environmental characteristics as those of the transceiver of 554a, the narrowband communication ranges 564b and 564c, of clients 554b and 554c respectively, are greater than distances 560 and 562 respectively. With this assumption, both devices 554b and 554c are capable of communicating with 554a. As these systems are employing numerous communication channels and unknown levels of interference, the time to initiate or re-establish communications may take 10 s of milliseconds to seconds, depending on the protocol used, as discussed in more detail above. These systems also employ broadband communications, and, for that purpose, rather than using a heterodyne receiver, they employ a rectifier or envelope detector that rectifies signals across a large bandwidth. For bandwidth, gain or other reasons, the receiver sensitivities of the transceivers of clients 554a-c may be poorer than those of their corresponding narrowband receivers. It is also possible that the transmit power of these devices for broadband communications is lower than for narrowband communication, further limiting range of communication. The broadband communication ranges 574a and 574b for clients 554a and 554b, respectively, are larger than the distance 560 between clients 554a and 554b, and thus broadband communication between clients 554a and 554b is also possible. Therefore, clients 554a and 554b are capable of reduced latency and high bandwidth communications compared to a narrowband transceiver alone, and are able to be at a separation distance 560 appropriate to a specific application. However, separation distance 562 is larger than the broadband communication ranges 574a and 574c of clients 554a and 554c respectively, and so they can communicate only with higher latency and narrow bandwidth communications. This example demonstrates that under certain circumstances low latency high bandwidth communication using a broadband transceiver may be limited to ranges shorter than narrowband communications, but should not degrade existing wireless standards and protocols. In some cases, the reduced distance limitation could be advantageous to ensuring that users who wish to share some types of information faster than is conventionally done have the knowledge that this distance limitation may be restricted to their visual field, for example.

Figure 4:
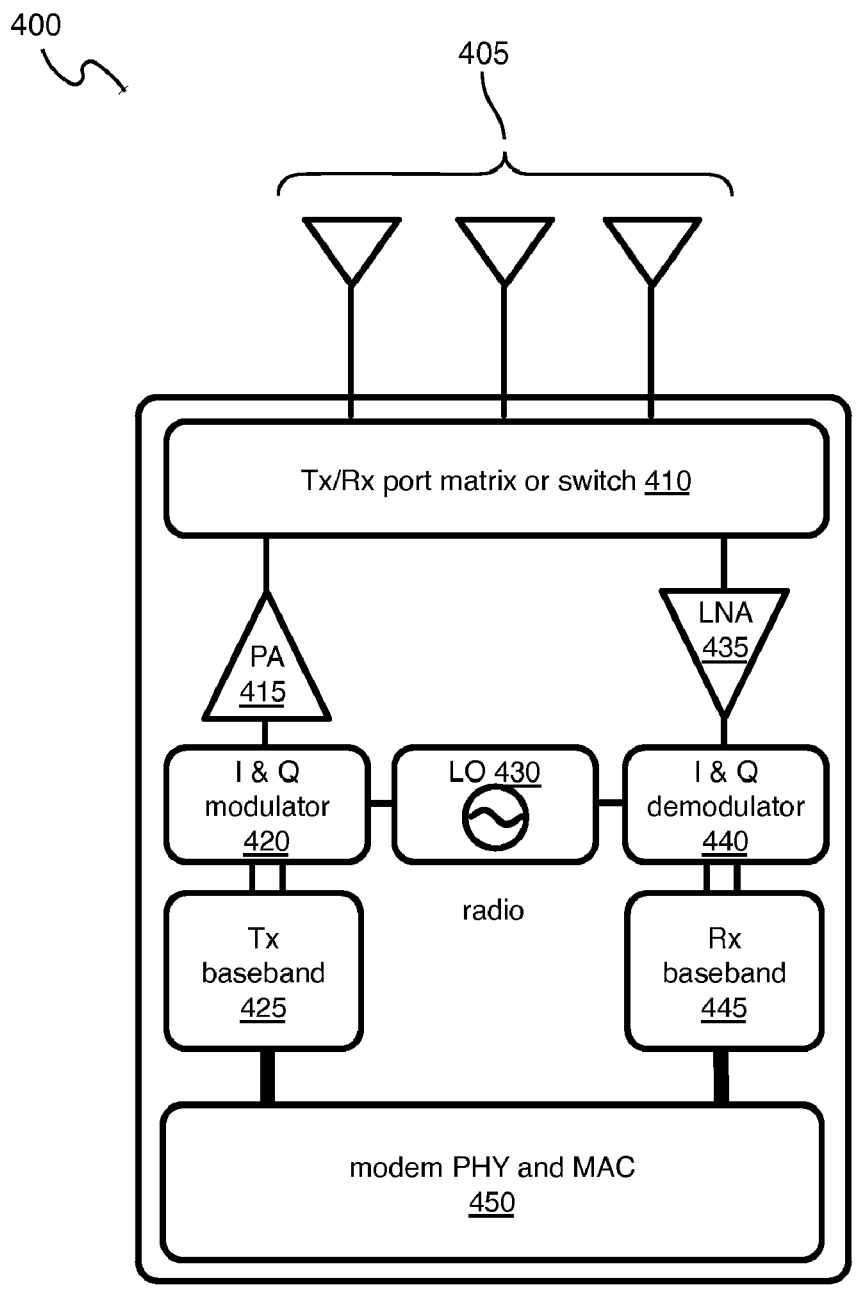
FIG. 4 is a schematic diagram of the transceiver portion of a conventional mobile communications device 400.
Figure 6:
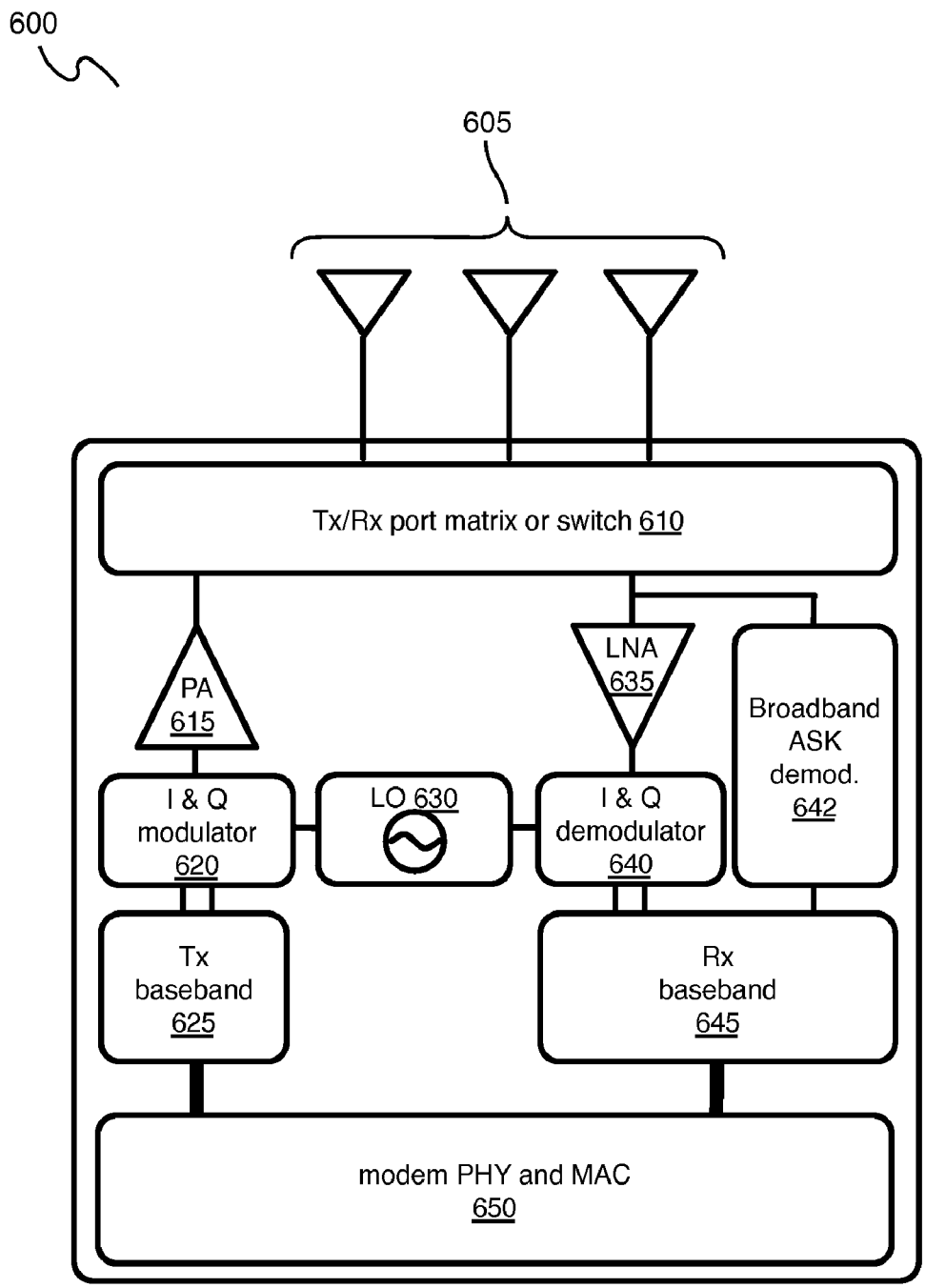
FIG. 6 is a schematic diagram of the transceiver section of a new mobile communications device 600 based on that in FIG. 5A, in accordance with an embodiment of the present invention.

FIG. 6 is a schematic diagram of the transceiver section of a new mobile communications device 600 based on that in FIG. 5A, in accordance with an embodiment of the present invention. The transceiver section contains a broadband ASK demodulator 642 to allow digital data to immediately be received by the radio modem PHY and MAC 650 even if two devices exist on separate channels in the narrowband communication system. This may be a separate data path from the antenna(s) 605 and switch 610 than the LNA 635 and narrowband I&Q demodulator 640 and may be converted to digital information by the receive baseband 645. It should be noted that the broadband demodulator 642 is not required to use the local oscillator (LO) 630 to decode the bits pattern into the receive baseband 645 and hence is able to decode bits at any frequency at which another device is capable of transmitting. It should also be noted that the broadband demodulator could optionally use the LNA component 635. The transmitter chain 650, 625, 620, 615 (which typically is substantially the same as the transmitter chain 450, 425, 420, 415 of the device shown in FIG. 4) may be adapted or otherwise used to transmit signals for a broadband receiver (in addition to I&Q modulated signals for communication over the narrowband communication system) since such transmitters are generally capable of supporting multiple modulation schemes, including OFDM, PSK and ASK. Alternatively, a separate broadband transmitter may be included in the device. The broadband ASK demodulator 642 may receive power from any frequency within the bandwidth of the antenna, and therefore may be jammed more frequently than the narrowband demodulator 640. The broadband ASK demodulator 642 uses amplitude levels to set the corresponding high and low phases of a binary symbol—the bits themselves may be decoded as time differences in the symbols, such as the PIE encoding using by the GS1 Generation 2 v1.20 protocol. This amplitude thresholding may result in the implementation margin of the symbols being significantly higher than the narrowband receiver (650 645 640 635) since it does not use all the information present in the symbols. It should be noted that broadband ASK demodulators are responsive to a wide bandwidth, but are capable of rejecting lower power input ASK signals that are input at different channels; this is described in the DRM subcomponent of the GS1 Generation 2 v1.20 protocol. Overall, the use of a broadband transceiver allows a trade-off between minimizing latency versus link margin, with no actual loss of link margin due to the presence of the original narrowband transceiver. As the embodiment described herein is an example, different structures for the narrowband and broadband transceivers are possible: If power optimization is required on the transmitter and/or if broadband and narrowband operation are simultaneously required, independent transmitter chains could be used for broadband and narrowband operation. On the receiver side, the broadband ASK demodulator 642 could be replaced by a demodulator and modulator (active and/or passive) to allow a base station to send information to a client but also to allow the client to respond immediately with a message such as a connection request, physical layer or MAC parameters, security, or information relevant to other layers of the OSI model, such as data link information, security keys and protocols, IP and other network protocol information, or application information.

Figure 7:
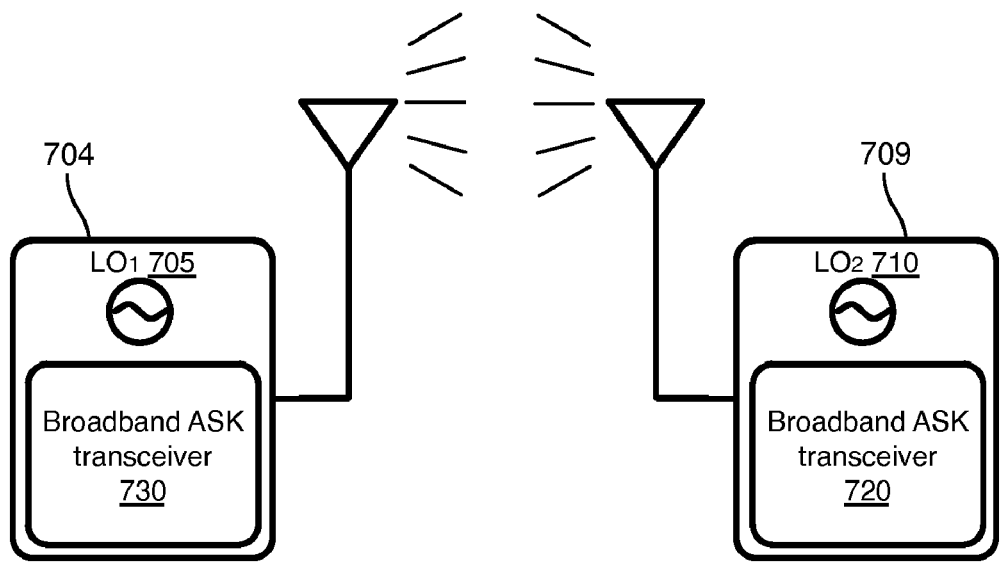
FIG. 7 is a diagram, in accordance with an embodiment of the present invention, of the two mobile communications devices from FIG. 2, but now with broadband ASK transceivers 730 and 720, respectively, in addition to the narrowband transceivers operating at different frequencies based on their local oscillator (LO) frequencies 705 and 710, respectively.

FIG. 7 is a diagram, in accordance with an embodiment of the present invention, of the two mobile communications devices from FIG. 2, but now with broadband ASK transceivers 730 and 720, respectively, in addition to the narrowband transceivers operating at different frequencies based on their local oscillator (LO) frequencies 705 and 710, respectively. In one example, one device 704 uses a local oscillator LO1 705 and the other device 709 uses a local oscillator LO2 710, and as long as the link margin is sufficient for broadband communication between the two devices, the devices are able to exchange relevant information via the broadband communication channel, typically in a time much shorter than the two devices setting their local oscillators to the same channel. As discussed above, the information passed via broadband communication may include device identification information or other information about the radio or layers above the MAC and PHY layers, but generally at least the frequency at which the local oscillator of the device is operating. In one exemplary embodiment, latency is minimized for a reduction in link margin, and, to enable the exchange of this information, the two devices are closer to each other than the ultimate range over which the devices can communicate via the narrowband communication system. If the devices are too far apart for this low-latency data exchange, the devices may (and normally would) fall back to their normal narrowband demodulators. It should be noted that in some embodiments, one of the devices may be a dedicated base station device, while in other embodiments, one of the devices will assume the role of the base station. Thus, for example, device 704 may act the base station in one transaction to send the frequency of its LO 705 to device 709, while device 709 may act as the base station in another transaction to send the frequency of its LO 710 to device 704.

Typically, the base station device (or a device acting as a base station device, i.e., a device used to initiate communication) will transmit predetermined broadband signals either continuously or from time to time. If the base station device has separate broadband and narrowband transmitters, then the device may transmit the broadband signals concurrently with transmission of narrowband signals, e.g., the device may concurrently try to establish a communication connection using both the broadband transmitter and the narrowband transmitter. If the base station device uses a common transmitter for both broadband and narrowband transmissions, then the device may try to establish a communication connection by alternating between transmission of broadband signals and transmission of narrowband signals. In either case, once a broadband communication is established with another device, information can be passed between the devices as discussed above, and the devices can switch to narrowband communications based on such information.

Any mobile communications device having an appropriate broadband demodulator that comes within range of the base station device can receive the broadband transmissions. The base station may allow for communication with any passing device or may limit communication only to one or more specific devices (e.g., using a device address or other device identifier). The communication may be unidirectional (i.e., from base station device to mobile communications device) or may be bi-directional (e.g., the devices may establish a two-way communication connection or otherwise may pass data to one another).

Figure 8:
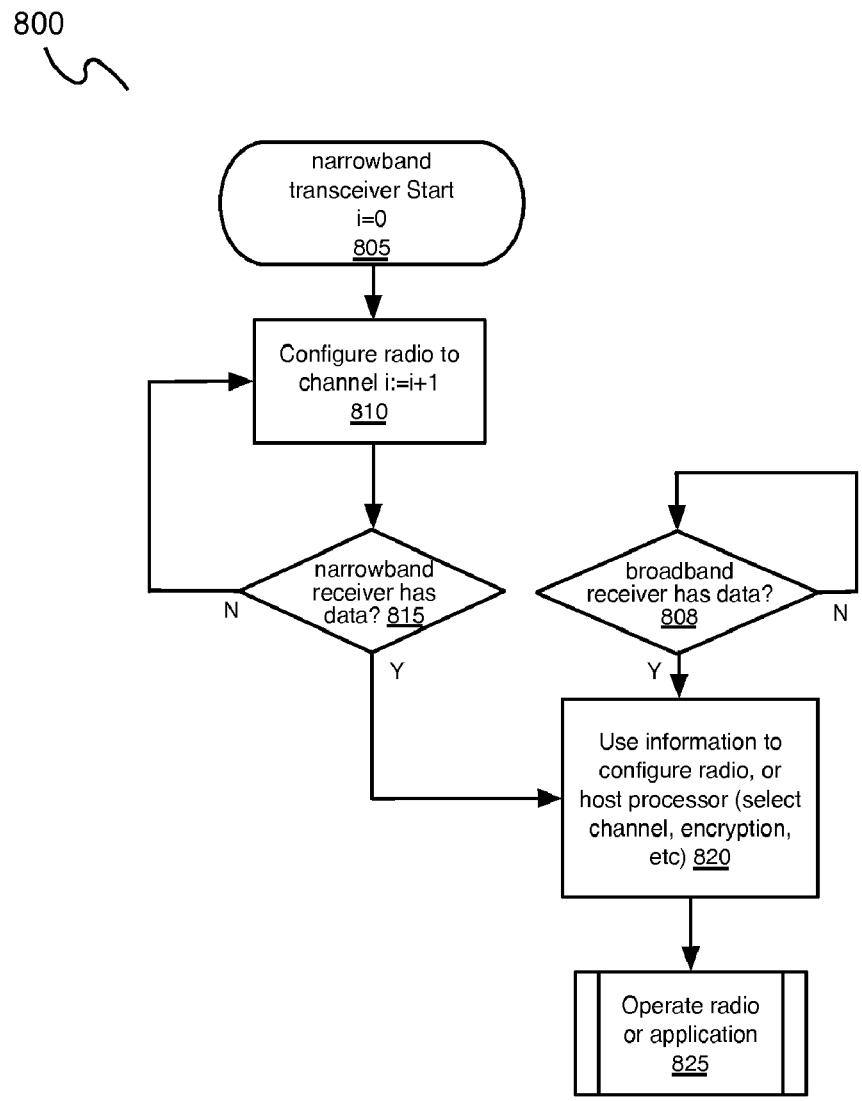
FIG. 8 is a flow diagram 800 of how the two receiver paths of a device such as the device 600 can use information to minimize latency and maximize throughput, in accordance with one exemplary embodiment.

FIG. 8 is a flow diagram 800 of how the two receiver paths of a device such as the device 600 can use information to minimize latency and maximize throughput, in accordance with one exemplary embodiment. As described in FIG. 6, the broadband demodulator 642 may receive data in a parallel path with the narrowband receiver 635 and 640. In parallel, the narrowband receiver and the broadband receiver will be monitored for the presence of data. Monitoring the narrowband receiver involves initiating the narrowband receiver in block 805 and then iteratively stepping through channels (block 810) and checking if the narrowband receiver has data (block 815). If either path has information (YES in block 808 or block 815), such data may be used to immediately configure the radio or application processor (block 820) so that the radio or application can operate (block 825). Otherwise, the radio operates in the same manner it operated in before the broadband transceiver was introduced into the system; that is, the narrowband transceiver will be reconfigured to operate on a different channel to try again to communicate with a base station or other client.

Figure 9A:
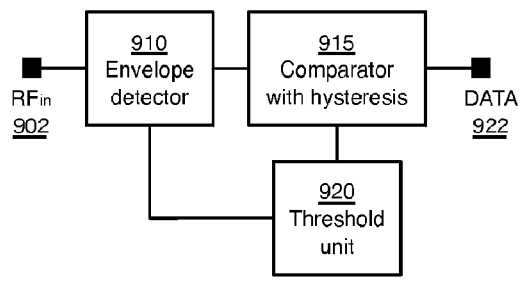
FIG. 9A shows an illustrative embodiment of the broadband ASK demodulator in accordance with an embodiment of the present invention.

FIG. 9A shows an illustrative embodiment of the broadband ASK demodulator in accordance with an embodiment of the present invention. The RF signal in 902 from one of the antenna ports 605 is directed into an envelope detector 910, which exploits a non-linear device to rectify the RF signal, effectively down converting it down to baseband. The output of the envelope detector is also input into a threshold unit 920, a dynamic module to enable bit slicing. A dynamic threshold is required to ensure bits are properly decoded from the transmitter. The output of the envelope detector 910 and the threshold unit 920 are input into the comparator and hysteresis module 915, converting the two analog signals into a digital out, or DATA. If the levels from the comparator with hysteresis 915 are within those of a CMOS digital circuit levels ($V_{dd}/2$ to Vdd for bit 1 and between GND to $V_{dd}/2$ for bit 0), then the output stream of digital information may be passed to a logic decoder to turn the timing information into a digital stream.

Figure 9B:
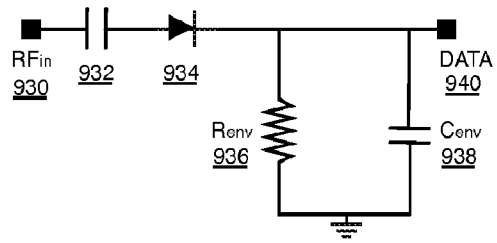
FIG. 9B shows a basic envelope detector 910 in accordance with an embodiment of the present invention.

FIG. 9B shows a basic envelope detector 910 in accordance with an embodiment of the present invention. In FIG. 9B, after DC removal with a bypass capacitor 932, a diode 934 rectifies the incoming signal and produces a current, and a low-pass filter made of $R_{env}$ 936 and $C_{env}$ act as an envelope tracker or low pass filter from the rectified signal.

Figure 9C:
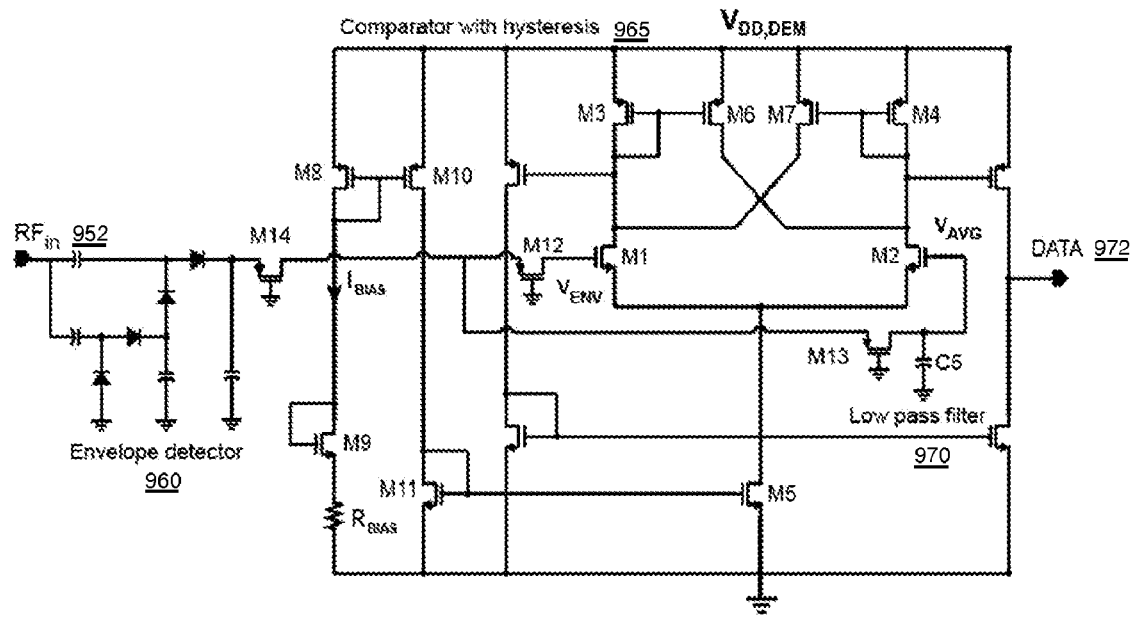
FIG. 9C illustrates an envelope detector and associated circuitry for use with embodiments herein.

FIG. 9C illustrates an envelope detector and associated circuitry for use with embodiments herein. The schematic of FIG. 9C is taken from Jong-Wook Lee and Bomson Lee, "Long-Range UHF-Band Passive RFID Tag IC Based on High-Q Design Approach," IEEE Transactions on Industrial Electronics, 57(7):2308-2316 (2009). FIG. 9C, shows a CMOS circuit including the envelope detector 960, comparator with hysteresis 965, voltage level-setting and low-pass filter 970. The state-of-the-art demonstrated for circuits of this nature are passive RFID tags, which are sensitive to −20 dBm, and battery-assisted passive tags have been demonstrated to be sensitive to −30 to −34 dBm. If the mobile device or base station contains a RFID reader to communicate with one or more wireless tags, but also contains a tag emulation circuit, the broadband demodulation circuit may be useful for the applications described herein. In that case, the majority of the radio (antenna, switching circuitry, modem and corresponding software) would be shared, allowing costs to be reduced. Other types of envelope detectors may be used, such as RF logarithm detectors.

Figure 10:
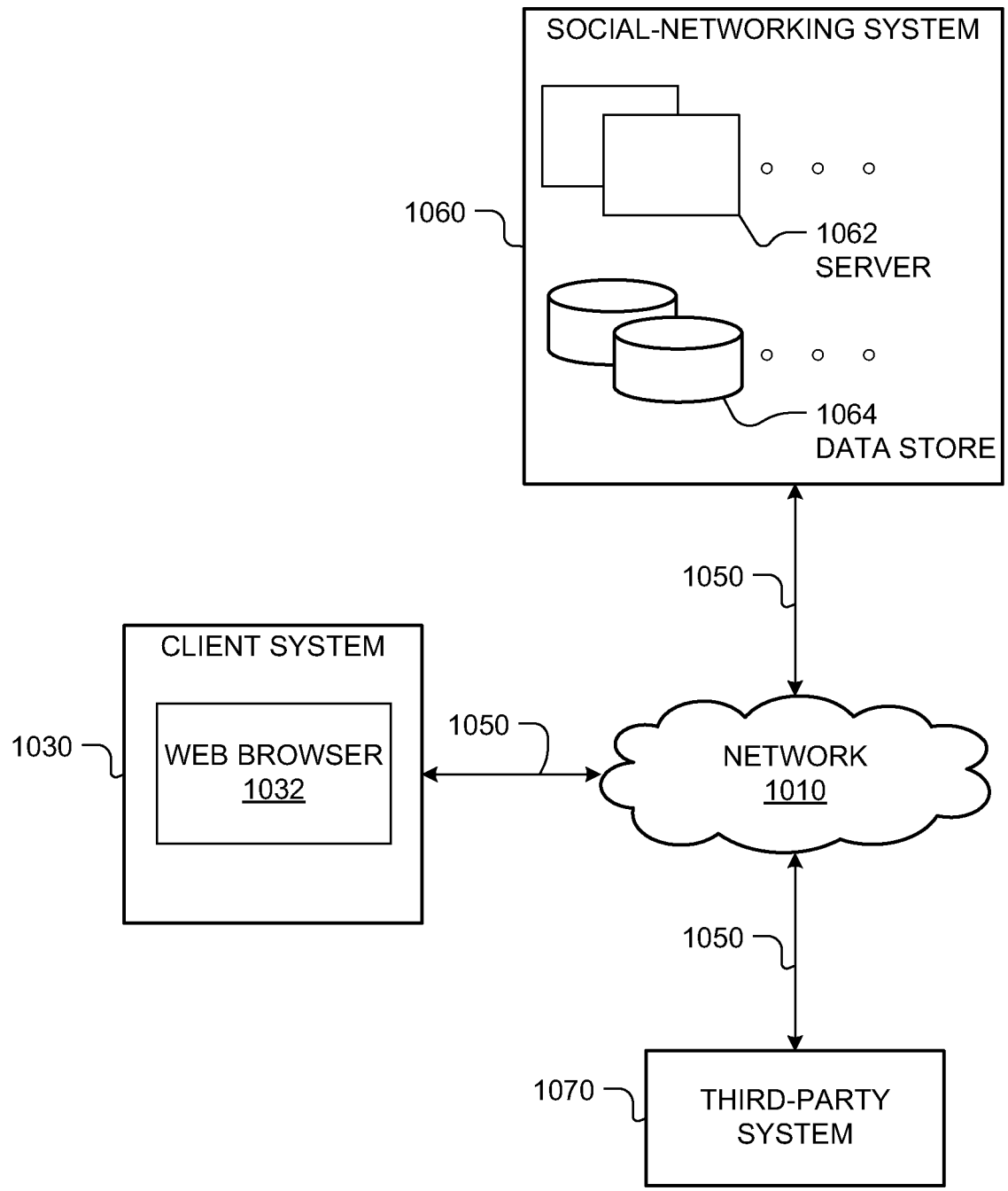
FIG. 10 illustrates an example network environment associated with a social-networking system.

FIG. 10 illustrates an example network environment 1000 associated with a social-networking system. Network environment 1000 includes a client system 1030, a social-networking system 1060, and a third-party system 1070 connected to each other by a network 1010. Although FIG. 10 illustrates a particular arrangement of client system 1030, social-networking system 1060, third-party system 1070, and network 1010, this disclosure contemplates any suitable arrangement of client system 1030, social-networking system 1060, third-party system 1070, and network 1010. As an example and not by way of limitation, two or more of client system 1030, social-networking system 1060, and third-party system 1070 may be connected to each other directly, bypassing network 1010. As another example, two or more of client system 1030, social-networking system 1060, and third-party system 1070 may be physically or logically co-located with each other in whole or in part. Moreover, although FIG. 10 illustrates a particular number of client systems 1030, social-networking systems 1060, third-party systems 1070, and networks 1010, this disclosure contemplates any suitable number of client systems 1030, social-networking systems 1060, third-party systems 1070, and networks 1010. As an example and not by way of limitation, network environment 1000 may include multiple client system 1030, social-networking systems 1060, third-party systems 1070, and networks 1010.

This disclosure contemplates any suitable network 1010. As an example and not by way of limitation, one or more portions of network 1010 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 may connect client system 1030, social-networking system 1060, and third-party system 1070 to communication network 1010 or to each other. This disclosure contemplates any suitable links 1050. In particular embodiments, one or more links 1050 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1050 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1050, or a combination of two or more such links 1050. Links 1050 need not necessarily be the same throughout network environment 1000. One or more first links 1050 may differ in one or more respects from one or more second links 1050.

In particular embodiments, client system 1030 may be an electronic device including hardware, software, or embedded logic components or a combination of two or more such components and capable of carrying out the appropriate functionalities implemented or supported by client system 1030. As an example and not by way of limitation, a client system 1030 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 1030. A client system 1030 may enable a network user at client system 1030 to access network 1010. A client system 1030 may enable its user to communicate with other users at other client systems 1030.

In particular embodiments, client system 1030 may include a web browser 1032, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1030 may enter a Uniform Resource Locator (URL) or other address directing the web browser 1032 to a particular server (such as server 1062, or a server associated with a third-party system 1070), and the web browser 1032 may generate a Hyper Text Transfer Protocol (HTTP) request and communicate the HTTP request to server. The server may accept the HTTP request and communicate to client system 1030 one or more Hyper Text Markup Language (HTML) files responsive to the HTTP request. Client system 1030 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 1060 may be a network-addressable computing system that can host an online social network. Social-networking system 1060 may generate, store, receive, and send social-networking data, such as, for example, user-profile data, concept-profile data, social-graph information, or other suitable data related to the online social network. Social-networking system 1060 may be accessed by the other components of network environment 1000 either directly or via network 1010. In particular embodiments, social-networking system 1060 may include one or more servers 1062. Each server 1062 may be a unitary server or a distributed server spanning multiple computers or multiple datacenters. Servers 1062 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1062 may include hardware, software, or embedded logic components or a combination of two or more such components for carrying out the appropriate functionalities implemented or supported by server 1062. In particular embodiments, social-networking system 1064 may include one or more data stores 1064. Data stores 1064 may be used to store various types of information. In particular embodiments, the information stored in data stores 1064 may be organized according to specific data structures. In particular embodiments, each data store 1064 may be a relational, columnar, correlation, or other suitable database. Although this disclosure describes or illustrates particular types of databases, this disclosure contemplates any suitable types of databases. Particular embodiments may provide interfaces that enable a client system 1030, a social-networking system 1060, or a third-party system 1070 to manage, retrieve, modify, add, or delete, the information stored in data store 1064.

In particular embodiments, social-networking system 1060 may store one or more social graphs in one or more data stores 1064. In particular embodiments, a social graph may include multiple nodes—which may include multiple user nodes (each corresponding to a particular user) or multiple concept nodes (each corresponding to a particular concept)— and multiple edges connecting the nodes. Social-networking system 1060 may provide users of the online social network the ability to communicate and interact with other users. In particular embodiments, users may join the online social network via social-networking system 1060 and then add connections (e.g., relationships) to a number of other users of social-networking system 1060 whom they want to be connected to. Herein, the term "friend" may refer to any other user of social-networking system 1060 with whom a user has formed a connection, association, or relationship via social-networking system 1060.

In particular embodiments, social-networking system 1060 may provide users with the ability to take actions on various types of items or objects, supported by social-networking system 1060. As an example and not by way of limitation, the items and objects may include groups or social networks to which users of social-networking system 1060 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1060 or by an external system of third-party system 1070, which is separate from social-networking system 1060 and coupled to social-networking system 1060 via a network 1010.

In particular embodiments, social-networking system 1060 may be capable of linking a variety of entities. As an example and not by way of limitation, social-networking system 1060 may enable users to interact with each other as well as receive content from third-party systems 1070 or other entities, or to allow users to interact with these entities through an application programming interfaces (API) or other communication channels.

In particular embodiments, a third-party system 1070 may include one or more types of servers, one or more data stores, one or more interfaces, including but not limited to APIs, one or more web services, one or more content sources, one or more networks, or any other suitable components, e.g., that servers may communicate with. A third-party system 1070 may be operated by a different entity from an entity operating social-networking system 1060. In particular embodiments, however, social-networking system 1060 and third-party systems 1070 may operate in conjunction with each other to provide social-networking services to users of social-networking system 1060 or third-party systems 1070. In this sense, social-networking system 1060 may provide a platform, or backbone, which other systems, such as third-party systems 1070, may use to provide social-networking services and functionality to users across the Internet.

In particular embodiments, a third-party system 1070 may include a third-party content object provider. A third-party content object provider may include one or more sources of content objects, which may be communicated to a client system 1030. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1060 also includes user-generated content objects, which may enhance a user's interactions with social-networking system 1060. User-generated content may include anything a user can add, upload, send, or "post" to social-networking system 1060. As an example and not by way of limitation, a user communicates posts to social-networking system 1060 from a client system 1030. Posts may include data such as status updates or other textual data, location information, photos, videos, links, music or other similar data or media. Content may also be added to social-networking system 1060 by a third-party through a "communication channel," such as a newsfeed or stream.

In particular embodiments, social-networking system 1060 may include a variety of servers, sub-systems, programs, modules, logs, and data stores. In particular embodiments, social-networking system 1060 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1060 may also include suitable components such as network interfaces, security mechanisms, load balancers, failover servers, management-and-network-operations consoles, other suitable components, or any suitable combination thereof. In particular embodiments, social-networking system 1060 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1060 to one or more client systems 1030 or one or more third-party system 1070 via network 1010. The web server may include a mail server or other messaging functionality for receiving and routing messages between social-networking system 1060 and one or more client systems 1030. An API-request server may allow a third-party system 1070 to access information from social-networking system 1060 by calling one or more APIs. An action logger may be used to receive communications from a web server about a user's actions on or off social-networking system 1060. In conjunction with the action log, a third-party-content-object log may be maintained of user exposures to third-party-content objects. A notification controller may provide information regarding content objects to a client system 1030. Information may be pushed to a client system 1030 as notifications, or information may be pulled from client system 1030 responsive to a request received from client system 1030. Authorization servers may be used to enforce one or more privacy settings of the users of social-networking system 1060. A privacy setting of a user determines how particular information associated with a user can be shared. The authorization server may allow users to opt in to or opt out of having their actions logged by social-networking system 1060 or shared with other systems (e.g., third-party system 1070), such as, for example, by setting appropriate privacy settings. Third-party-content-object stores may be used to store content objects received from third parties, such as a third-party system 1070. Location stores may be used for storing location information received from client systems 1030 associated with users. Advertisement-pricing modules may combine social information, the current time, location information, or other suitable information to provide relevant advertisements, in the form of notifications, to a user.

Figure 11:
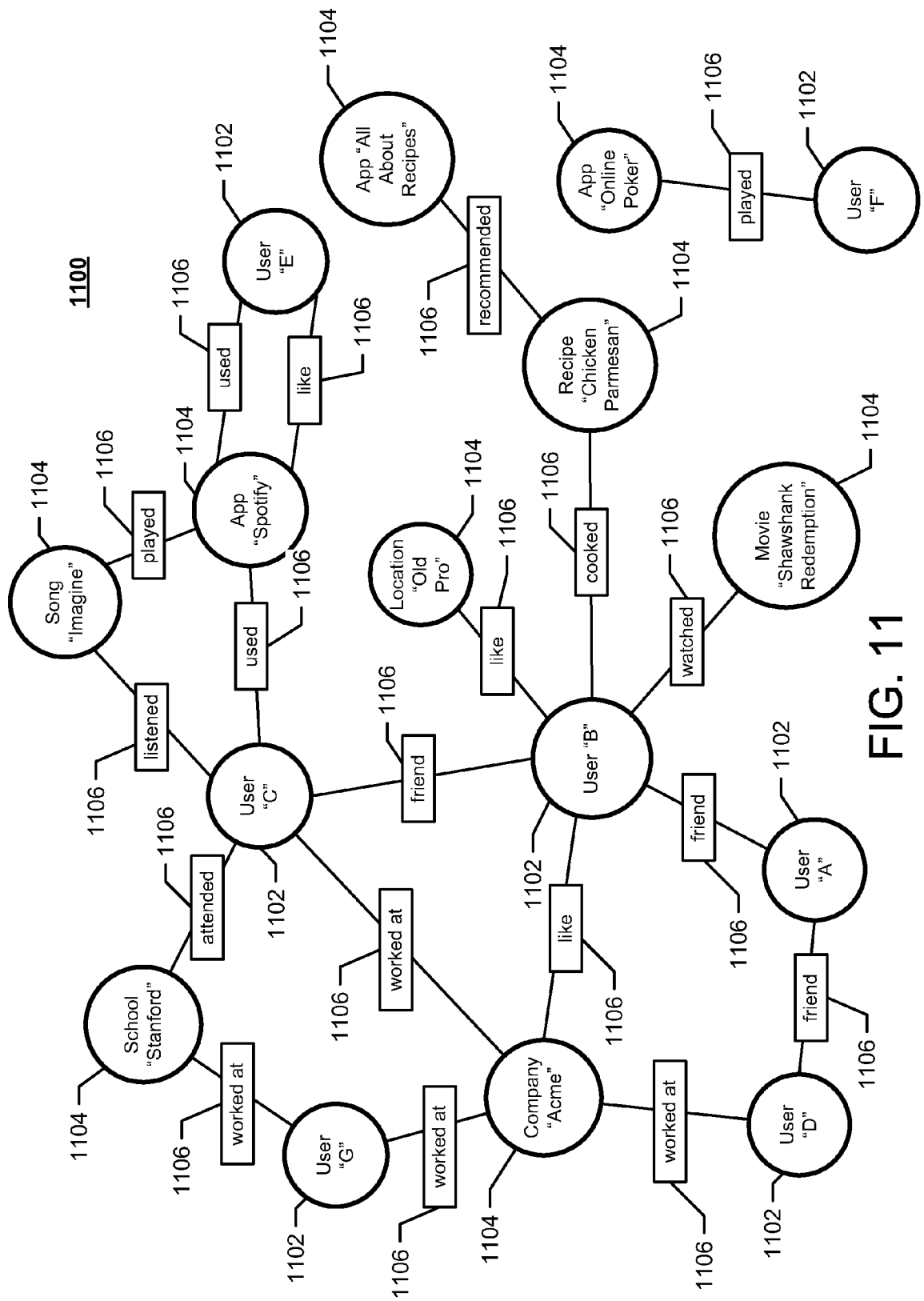
FIG. 11 illustrates an example social graph.

FIG. 11 illustrates example social graph 1100. In particular embodiments, social-networking system 1060 may store one or more social graphs 1100 in one or more data stores. In particular embodiments, social graph 1100 may include multiple nodes—which may include multiple user nodes 1102 or multiple concept nodes 1104—and multiple edges 1106 connecting the nodes. Example social graph 1100 illustrated in FIG. 11 is shown, for didactic purposes, in a two-dimensional visual map representation. In particular embodiments, a social-networking system 1060, client system 1030, or third-party system 1070 may access social graph 1100 and related social-graph information for suitable applications. The nodes and edges of social graph 1100 may be stored as data objects, for example, in a data store (such as a social-graph database). Such a data store may include one or more searchable or queryable indexes of nodes or edges of social graph 1100.

In particular embodiments, a user node 1102 may correspond to a user of social-networking system 1060. As an example and not by way of limitation, a user may be an individual (human user), an entity (e.g., an enterprise, business, or third-party application), or a group (e.g., of individuals or entities) that interacts or communicates with or over social-networking system 1060. In particular embodiments, when a user registers for an account with social-networking system 1060, social-networking system 1060 may create a user node 1102 corresponding to the user, and store the user node 1102 in one or more data stores. Users and user nodes 1102 described herein may, where appropriate, refer to registered users and user nodes 1102 associated with registered users. In addition or as an alternative, users and user nodes 1102 described herein may, where appropriate, refer to users that have not registered with social-networking system 1060. In particular embodiments, a user node 1102 may be associated with information provided by a user or information gathered by various systems, including social-networking system 1060. As an example and not by way of limitation, a user may provide his or her name, profile picture, contact information, birth date, sex, marital status, family status, employment, education background, preferences, interests, or other demographic information. In particular embodiments, a user node 1102 may be associated with one or more data objects corresponding to information associated with a user. In particular embodiments, a user node 1102 may correspond to one or more webpages.

In particular embodiments, a concept node 1104 may correspond to a concept. As an example and not by way of limitation, a concept may correspond to a place (such as, for example, a movie theater, restaurant, landmark, or city); a website (such as, for example, a website associated with social-network system 1060 or a third-party website associated with a web-application server); an entity (such as, for example, a person, business, group, sports team, or celebrity); a resource (such as, for example, an audio file, video file, digital photo, text file, structured document, or application) which may be located within social-networking system 1060 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1104 may be associated with information of a concept provided by a user or information gathered by various systems, including social-networking system 1060. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1104 may be associated with one or more data objects corresponding to information associated with concept node 1104. In particular embodiments, a concept node 1104 may correspond to one or more webpages.

In particular embodiments, a node in social graph 1100 may represent or be represented by a webpage (which may be referred to as a "profile page"). Profile pages may be hosted by or accessible to social-networking system 1060. Profile pages may also be hosted on third-party websites associated with a third-party server 1070. As an example and not by way of limitation, a profile page corresponding to a particular external webpage may be the particular external webpage and the profile page may correspond to a particular concept node 1104. Profile pages may be viewable by all or a selected subset of other users. As an example and not by way of limitation, a user node 1102 may have a corresponding user-profile page in which the corresponding user may add content, make declarations, or otherwise express himself or herself. As another example and not by way of limitation, a concept node 1104 may have a corresponding concept-profile page in which one or more users may add content, make declarations, or express themselves, particularly in relation to the concept corresponding to concept node 1104.

In particular embodiments, a concept node 1104 may represent a third-party webpage or resource hosted by a third-party system 1070. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1030 to send to social-networking system 1060 a message indicating the user's action. In response to the message, social-networking system 1060 may create an edge (e.g., an "eat" edge) between a user node 1102 corresponding to the user and a concept node 1104 corresponding to the third-party webpage or resource and store edge 1106 in one or more data stores.

In particular embodiments, a pair of nodes in social graph 1100 may be connected to each other by one or more edges 1106. An edge 1106 connecting a pair of nodes may represent a relationship between the pair of nodes. In particular embodiments, an edge 1106 may include or represent one or more data objects or attributes corresponding to the relationship between a pair of nodes. As an example and not by way of limitation, a first user may indicate that a second user is a "friend" of the first user. In response to this indication, social-networking system 1060 may send a "friend request" to the second user. If the second user confirms the "friend request," social-networking system 1060 may create an edge 1106 connecting the first user's user node 1102 to the second user's user node 1102 in social graph 1100 and store edge 1106 as social-graph information in one or more of data stores 1064. In the example of FIG. 11, social graph 1100 includes an edge 1106 indicating a friend relation between user nodes 1102 of user "A" and user "B" and an edge indicating a friend relation between user nodes 1102 of user "C" and user "B." Although this disclosure describes or illustrates particular edges 1106 with particular attributes connecting particular user nodes 1102, this disclosure contemplates any suitable edges 1106 with any suitable attributes connecting user nodes 1102. As an example and not by way of limitation, an edge 1106 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1100 by one or more edges 1106.

In particular embodiments, an edge 1106 between a user node 1102 and a concept node 1104 may represent a particular action or activity performed by a user associated with user node 1102 toward a concept associated with a concept node 1104. As an example and not by way of limitation, as illustrated in FIG. 11, a user may "like," "attended," "played," "listened," "cooked," "worked at," or "watched" a concept, each of which may correspond to a edge type or subtype. A concept-profile page corresponding to a concept node 1104 may include, for example, a selectable "check in" icon (such as, for example, a clickable "check in" icon) or a selectable "add to favorites" icon. Similarly, after a user clicks these icons, social-networking system 1060 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 1060 may create a "listened" edge 1106 and a "used" edge (as illustrated in FIG. 11) between user nodes 1102 corresponding to the user and concept nodes 1104 corresponding to the song and application to indicate that the user listened to the song and used the application. Moreover, social-networking system 1060 may create a "played" edge 1106 (as illustrated in FIG. 11) between concept nodes 1104 corresponding to the song and the application to indicate that the particular song was played by the particular application. In this case, "played" edge 1106 corresponds to an action performed by an external application (SPOTIFY) on an external audio file (the song "Imagine"). Although this disclosure describes particular edges 1106 with particular attributes connecting user nodes 1102 and concept nodes 1104, this disclosure contemplates any suitable edges 1106 with any suitable attributes connecting user nodes 1102 and concept nodes 1104. Moreover, although this disclosure describes edges between a user node 1102 and a concept node 1104 representing a single relationship, this disclosure contemplates edges between a user node 1102 and a concept node 1104 representing one or more relationships. As an example and not by way of limitation, an edge 1106 may represent both that a user likes and has used at a particular concept. Alternatively, another edge 1106 may represent each type of relationship (or multiples of a single relationship) between a user node 1102 and a concept node 1104 (as illustrated in FIG. 11 between user node 1102 for user "E" and concept node 1104 for "SPOTIFY").

In particular embodiments, social-networking system 1060 may create an edge 1106 between a user node 1102 and a concept node 1104 in social graph 1100. As an example and not by way of limitation, a user viewing a concept-profile page (such as, for example, by using a web browser or a special-purpose application hosted by the user's client system 1030) may indicate that he or she likes the concept represented by the concept node 1104 by clicking or selecting a "Like" icon, which may cause the user's client system 1030 to send to social-networking system 1060 a message indicating the user's liking of the concept associated with the concept-profile page. In response to the message, social-networking system 1060 may create an edge 1106 between user node 1102 associated with the user and concept node 1104, as illustrated by "like" edge 1106 between the user and concept node 1104. In particular embodiments, social-networking system 1060 may store an edge 1106 in one or more data stores. In particular embodiments, an edge 1106 may be automatically formed by social-networking system 1060 in response to a particular user action. As an example and not by way of limitation, if a first user uploads a picture, watches a movie, or listens to a song, an edge 1106 may be formed between user node 1102 corresponding to the first user and concept nodes 1104 corresponding to those concepts. Although this disclosure describes forming particular edges 1106 in particular manners, this disclosure contemplates forming any suitable edges 1106 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 1060). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 1060. In addition or as an alternative, the social action may be promoted outside or off of social-networking system 1060, where appropriate. In particular embodiments, a page may be an on-line presence (such as a webpage or website within or outside of social-networking system 1060) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 1060. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. us 2012/0203831, entitled "Sponsored Stories Unit Creation from Organic Activity Stream" and filed 3 Feb. 2012 as U.S. patent application Ser. No. 13/020,745, or U.S. Patent Application Publication No. us 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 1060) or RSVP (e.g., through social-networking system 1060) to an event associated with the advertisement. In addition or as an alternative, an advertisement may include social-networking-system context directed to the user. For example, an advertisement may display information about a friend of the user within social-networking system 1060 who has taken an action associated with the subject matter of the advertisement.

Social-networking-system functionality or context may be associated with an advertisement in any suitable manner. For example, an advertising system (which may include hardware, software, or both for receiving bids for advertisements and selecting advertisements in response) may retrieve social-networking functionality or context from social-networking system 1060 and incorporate the retrieved social-networking functionality or context into the advertisement before serving the advertisement to a user. Examples of selecting and providing social-networking-system functionality or context with an advertisement are disclosed in U.S. Patent Application Publication No. US 2012/0084160, entitled "Providing Social Endorsements with Online Advertising" and filed 5 Oct. 2010 as U.S. patent application Ser. No. 12/898,662, and in U.S. Patent Application Publication No. US 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or context may cause information about the interaction to be displayed in a profile page of the user in social-networking-system 1060.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 1060 to identify those users. In addition or as an alternative, social-networking system 1060 may use user-profile information in social-networking system 1060 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 1060, off or outside of social-networking system 1060, or on mobile computing devices of users. When on or within social-networking system 1060, such targeting may be directed to users' news feeds, search results, e-mail or other in-boxes, or notifications channels or may appear in particular area of web pages of social-networking system 1060, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 1060, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 1060 or explicit connections of a user to a node, object, entity, brand, or page on social-networking system 1060. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. US 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. US 2009/0070219, entitled "Targeting Advertisements in a Social Network" and filed 20 Aug. 2008 as U.S. patent application Ser. No. 12/195,321; U.S. Patent Application Publication No. US 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. US 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. US 2012/0159635, entitled "Comment Plug-In for Third-Party System" and filed 15 Dec. 2010 as U.S. patent application Ser. No. 12/969,368; U.S. Patent Application Publication No. US 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Patent Application Publication No. US 2008/0040475, entitled "Providing a News Feed Based on User Affinity in a Social Network Environment" and filed 11 Aug. 2006 as U.S. patent application Ser. No. 11/503,093; U.S. Patent Application Publication No. US 2012/0072428, entitled "Action Clustering for News Feeds" and filed 16 Sep. 2010 as U.S. patent application Ser. No. 12/884,010; U.S. Patent Application Publication No. US 2001/0004692, entitled "Gathering Information about Connections in a Social Networking Service" and filed 1 Jul. 2009 as U.S. patent application Ser. No. 12/496,606; U.S. Patent Application Publication No. US 2008/0065701, entitled "Method and System for Tracking Changes to User Content in an Online Social Network" and filed 12 Sep. 2006 as U.S. patent application Ser. No. 11/531,154; U.S. Patent Application Publication No. US 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. US 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. US 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 1060 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1070 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 1060 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 1060 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 1060 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 1060 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 1060 may calculate a coefficient based on a user's actions. Social-networking system 1060 may monitor such actions on the online social network, on a third-party system 1070, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 1060 may calculate a coefficient based on the user's actions with particular types of content. The content may be associated with the online social network, a third-party system 1070, or another suitable system. The content may include users, profile pages, posts, news stories, headlines, instant messages, chat room conversations, emails, advertisements, pictures, video, music, other suitable objects, or any combination thereof. Social-networking system 1060 may analyze a user's actions to determine whether one or more of the actions indicate an affinity for subject matter, content, other users, and so forth. As an example and not by way of limitation, if a user may make frequently posts content related to "coffee" or variants thereof, social-networking system 1060 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 1060 may calculate a coefficient based on the type of relationship between particular objects. Referencing the social graph 1100, social-networking system 1060 may analyze the number and/or type of edges 1106 connecting particular user nodes 1102 and concept nodes 1104 when calculating a coefficient. As an example and not by way of limitation, user nodes 1102 that are connected by a spouse-type edge (representing that the two users are married) may be assigned a higher coefficient than a user nodes 1102 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 1060 may determine that the user has a higher coefficient with respect to the first photo than the second photo because having a tagged-in-type relationship with content may be assigned a higher weight and/or rating than having a like-type relationship with content. In particular embodiments, social-networking system 1060 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 1060 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1100. As an example and not by way of limitation, social-graph entities that are closer in the social graph 1100 (i.e., fewer degrees of separation) may have a higher coefficient than entities that are further apart in the social graph 1100.

In particular embodiments, social-networking system 1060 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 1030 of the user). A first user may be more interested in other users or concepts that are closer to the first user. As an example and not by way of limitation, if a user is one mile from an airport and two miles from a gas station, social-networking system 1060 may determine that the user has a higher coefficient for the airport than the gas station based on the proximity of the airport to the user.

In particular embodiments, social-networking system 1060 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 1060 may provide information that is relevant to user's interests and current circumstances, increasing the likelihood that they will find such information of interest. In particular embodiments, social-networking system 1060 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 1060 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 1060 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1070 (e.g., via an API or other communication channel), or from another suitable system. In response to the request, social-networking system 1060 may calculate the coefficient (or access the coefficient information if it has previously been calculated and stored). In particular embodiments, social-networking system 1060 may measure an affinity with respect to a particular process.

Different processes (both internal and external to the online social network) may request a coefficient for a particular object or set of objects. Social-networking system 1060 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

Particular embodiments may integrate third-party content delivery services using the narrowband communications channel such as cable providers and online video services with a social networking system for active and passive sharing of consumed content among the users of the social networking system. Such integration may permit a user of the social-networking system to discover content watched, "liked", or scheduled to be watched by the user's friends and first-degree connections. Similarly, the user may explicitly share content to his or her friends and first-degree connections by actively selecting user interface elements to "like" or "share" a piece of content, or passively share currently viewed content substantially in real-time by enabling a "sharing" mode.

In particular embodiments, users may discover or share content from any device or service connected to or accessible by the narrowband communications channel that is integrated with the social networking system. For example, a particular user may discover content not only by browsing his or her friends' profile pages stored on and rendered by the social networking system, but by accessing a third-party web page of a over the top (OTT) content provider such as NetFlix or Hulu. In particular embodiments, a user may discover or share content via his or her television set through a multiple system operator (MSO) or other cable provider. In particular embodiments, social data may be presented to the user through the electronic program guide received from the MSO by the user's set-top box (STB), and displayed on the user's television set. In particular embodiments, users of the social networking system may discover or share content via a specialized application for a third-party service on a mobile computing device, such as a smartphone or tablet. For example, the user may browse his or her friends' favorite movies or share his or her own favorite movies via a NetFlix application resident on the user's smartphone. As another example, a user may discover or share content via a smartphone application that is also linked to a MSO or cable provider, such as a mobile application for managing the user's digital video recorder (DVR) offered by AT&T U-Verse cable service.

Particular embodiments may map multiple content descriptors from a plurality of services of varying formats into a single content identifier. For example, four users may share that they are watching the show "The Office" from Hulu, NetFlix, Comcast cable, and Dish Network satellite TV. Each individual service providers' format for identifying content may be of a different format and include varying text or meta-data. Absent centralized aggregation of these heterogeneous content descriptors into a single content identifier, shares from users of disparate services are meaningless and unusable. Hence, particular embodiments provide a system for matching content identifiers of varying format to a single node within the social graph.

In connection with providing customized television programming, particular embodiments may utilize one or more systems, components, elements, functions, methods, operations, or steps disclosed in the following, which are all incorporated herein by reference as examples and not by way of limitation: U.S. patent application Ser. No. 13/440,306, entitled "Sharing Television and Video Programming Through Social Networking" and filed 5 Apr. 2012; and U.S. patent application Ser. No. 13/602,011, entitled "Sharing Television and Video Programming Through Social Networking" and filed 31 Aug. 2012.

Particular embodiments of this disclosure are directed to providing network access based on social-networking information. In a particular embodiment, a wireless access point may receive a request from a client system to access a network through the wireless access point over a narrowband communications channel. For example, a user may connect to the wireless access point using a smartphone, laptop, or tablet computer and attempt to access the Internet through Wi-Fi provided by the wireless access point. The wireless access point may send an identifier associated with the client system to a social-networking system. The social-networking system may include user profiles arranged in at least one social graph that stores relationships between the user profiles. The social-networking system may determine whether network access (e.g., Wi-Fi) should be provided to the client system based on the identifier associated with the client system and based upon a user profile of the social-networking system that includes the identifier. The social-networking system then sends the determination to the wireless access point. The social-networking system may provide network access to the client system in accordance with the determination by the social-networking system.

Such embodiments may allow an entity, such as a merchant, to provide free Wi-Fi access to customers that are willing to "check-in" with the merchant through the social-networking system. In particular embodiments, the customer may check in using a user name of a user profile or an identifier of the client system, such as a media access control (MAC) address. During the check-in process, the merchant may direct marketing information to the customer via the customer's device. In some embodiments, this information may be customized based on information about the customer obtained from the social-networking system.

Other embodiments may allow an owner of a wireless access point to designate which social-networking system users should receive automatic Wi-Fi access. For example, the owner may associate the owner's user profile with a wireless access point. The owner may then designate that certain users of the social-networking system may access Wi-Fi from the wireless access point without entering a password. For example, the owner may designate that users linked to the owner as "friends" in the social-networking system may automatically receive Wi-Fi access from the wireless access point when a device of the user is within range of the wireless access point.

In connection with determining whether a social-networking user is authorized to access the narrowband communications channel, particular embodiments may utilize one or more systems, components, elements, functions, methods, operations, or steps disclosed in the following, which are all incorporated herein by reference as examples and not by way of limitation: U.S. patent application Ser. No. 13/659,688, entitled "Network Access Based on Social-Networking Information" and filed 24 Oct. 2012.

Figure 12:
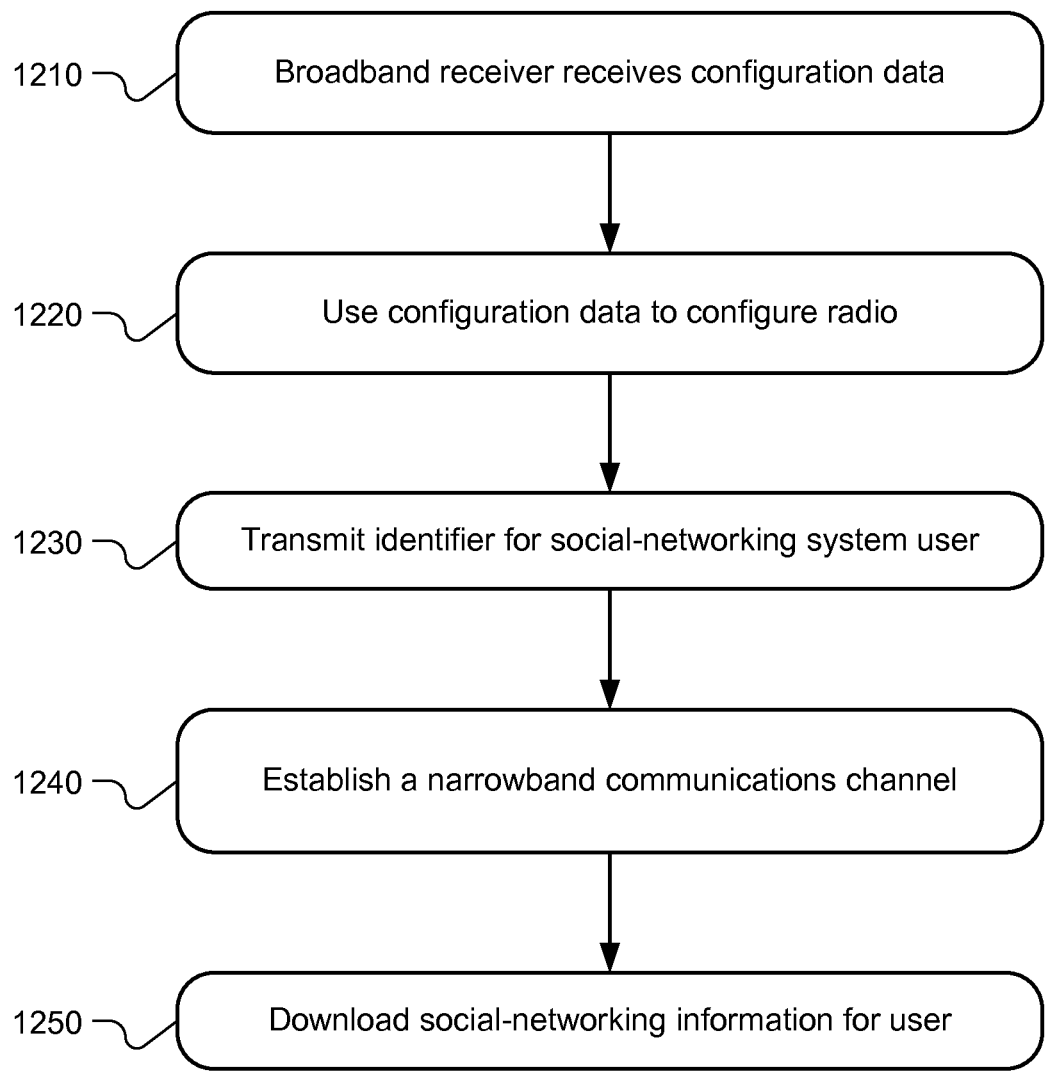
FIG. 12 is a flowchart of method steps in particular embodiments.

FIG. 12 is a flowchart of method steps in particular embodiments. In step 1210, a broadband receiver of a wireless communications device may receive configuration data. In step 1220, once the configuration data is received, the wireless communications device may use the configuration data to configure a broadband radio. In step 1230, wireless communications device may transmit an identifier for a user of a social-networking system. The connection information may comprise any information designed to facilitate authentication between the base station and a personal communication device, such as, by way of example and not limitation: an encrypted user identifier, exchanged passwords or secret keys; security keys exchanged through an unsecured communications port opened for a short window of time (e.g., by synchronizing the timing of opening the ports); or exchanged accelerometer signals (e.g., by "bumping" the devices together. In step 1240, the wireless communications device may establish a narrowband communications channel with the base station. The narrowband communications radio used to establish the channel may comprise a Wi-Fi transceiver; a Bluetooth transceiver; a cellular transceiver; or an RFID transceiver. As the narrowband communications channel is being established, the base station may use the identifier for the user to begin retrieving social-networking information for the user from a social-networking system. Receiving the identifier during the process of establishing the narrowband communications channel may result in a reduction in latency for providing social-networking information and functionality to the users. In step 1250, the wireless communications device may begin downloading social-networking information for the user, over the narrowband communications channel. At this point, the wireless communications device may be able to provide social-networking-related functionality for the social-networking users, such as providing targeted advertising to a social-networking user, performing automatic and/or passive check-in of a social-networking user, providing customized television programming based on a social-networking user's profile, or determining whether a social-networking user is authorized to connect to the base station.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions. Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should be noted that headings are used above for convenience and are not to be construed as limiting the present invention in any way.

It should be noted that terms such as "client," "server," "switch," and "node" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A wireless communications device comprising:
   a set of antennas;
   a narrowband transceiver coupled to a first member of the set of antennas;
   broadband receiver, coupled to a second member of the set of antennas, the broadband receiver configured to produce a digital signal; and
   circuitry, coupled to the narrowband transceiver and the broadband receiver, the circuitry configured to:
   process, in response to receiving the digital signal, connection information received by the broadband receiver, the connection information comprising an identifier for a personal communications device;
   detect, based on the identifier, that a user of a social-networking system is within proximity of the wireless communications device, the social-networking user being associated with the personal communications device;
   establish a communications channel for the narrowband transceiver based on the connection information; and
   communicate using the narrowband transceiver.

2. The device of claim 1, wherein the connection information further comprises a password or a secret key.

3. The device of claim 1, wherein the circuitry is further configured to:
   open an unsecured communications port for a short window of time to exchange security keys, wherein the digital signal comprises a first security key associated with the device, and wherein the connection information comprises a second security key.

4. The device of claim 1, further comprising an accelerometer, wherein the digital signal comprises an accelerometer signal, and wherein the connection information comprises an exchanged accelerometer signal.

5. The device of claim 1, wherein the narrowband transceiver is one of: a Wi-Fi transceiver; a Bluetooth transceiver; a cellular transceiver; or a radio-frequency identification (RFID) transceiver.

6. The device of claim 1, wherein the digital signal comprises: source device identification information; destination device identification information; channel identification information; security information; symbol rate information; error correction information; channel equalization information; timing information; protocol information; physical layer information; medium access control layer information; data link layer information; network layer information; or application information.

7. The device of claim 1, wherein the circuitry is further configured to:
perform social-networking-related functions for the detected social-networking user.

8. The device of claim 7, wherein the social-networking-related functions comprise: serving targeted advertising to the social-networking user, performing automatic check in of the social-networking user, providing customized TV programming to the social-networking user based on a user profile of the social-networking user, or determining whether the social-networking user is authorized to access the narrowband communications channel.

9. One or more computer-readable non-transitory storage media embodying software that is operable when executed to:
process connection information received by a broadband receiver of a wireless communications device in response to a digital signal, the broadband receiver being coupled to a first member of a set of antennas of the wireless communications device and the broadband receiver configured to produce the digital signal, wherein the connection information comprises an identifier for a personal communications device;
detect, based on the identifier, that a user of a social-networking system is within proximity of the wireless communications device, the social-networking user being associated with the personal communications device;
establish a communications channel for a narrowband transceiver based on the connection information, the narrowband transceiver being coupled to a second member of the set of antennas; and
communicate using the narrowband transceiver.

10. The media of claim 9, wherein the software is further operable when executed to:
perform social-networking-related functions for the detected social-networking user.

11. The media of claim 10, wherein the social-networking-related functions comprise: serving targeted advertising to the social-networking user, performing automatic check in of the social-networking user, providing customized TV programming to the social-networking user based on a user profile of the social-networking user, or determining whether the social-networking user is authorized to access the narrowband communications channel.

12. The media of claim 9, wherein the connection information further comprises a password or a secret key.

13. The media of claim 9, wherein the software is further operable when executed to:
open an unsecured communications port for a short window of time to exchange security keys, wherein the digital signal comprises a first security key associated with the device, and wherein the connection information comprises a second security key.

14. A method comprising:
processing, by one or more processors of a wireless communications device, connection information received by a broadband receiver of the wireless communications device in response to a digital signal, the broadband receiver being coupled to a first member of a set of antennas of the wireless communications device and the broadband receiver configured to produce the digital signal, wherein the connection information comprises an identifier for a personal communications device;
detecting, by the one or more processors, based on the identifier, that a user of a social-networking system is within proximity of the wireless communications device, the social-networking user being associated with the personal communications device;
establishing, by the one or more processors, a communications channel for a narrowband transceiver based on the connection information, the narrowband transceiver being coupled to a second member of the set of antennas; and
communicating, by the one or more processors, using the narrowband transceiver.

15. The method of claim 14, further comprising:
performing social-networking-related functions for the detected social-networking user.

16. The method of claim 15, wherein the social-networking-related functions comprise: serving targeted advertising to the social-networking user, performing automatic check in of the social-networking user, providing customized TV programming to the social-networking user based on a user profile of the social-networking user, or determining whether the social-networking user is authorized to access the narrowband communications channel.

17. The method of claim 15, wherein the connection information further comprises a password or a secret key.

* * * * *